(12) United States Patent
Mullins et al.

(10) Patent No.: US 8,736,087 B2
(45) Date of Patent: May 27, 2014

(54) METHODS AND APPARATUS FOR CONTROL OF BIOMECHANICAL ENERGY HARVESTING

(75) Inventors: Clive Edward Mullins, North Vancouver (CA); Daniel Loren Hepler, Vancouver (CA)

(73) Assignee: Bionic Power Inc., Burnaby (CA)

( * ) Notice: Subject to any disclaimer, the term of this patent is extended or adjusted under 35 U.S.C. 154(b) by 319 days.

(21) Appl. No.: 13/224,221

(22) Filed: Sep. 1, 2011

(65) Prior Publication Data
US 2013/0056981 A1     Mar. 7, 2013

(51) Int. Cl.
*F02B 63/04*     (2006.01)

(52) U.S. Cl.
USPC .................................. 290/1 R; 290/7; 623/24

(58) Field of Classification Search
None
See application file for complete search history.

(56) References Cited

U.S. PATENT DOCUMENTS

| | | | |
|---|---|---|---|
| 1,184,056 | A | 5/1916 | Van Deventer |
| 1,472,335 | A | 5/1922 | Luzy |
| 3,358,678 | A | 12/1967 | Kultsar |
| 3,573,479 | A | 4/1971 | Rieth |
| 3,631,542 | A | 1/1972 | Potter |
| 3,820,168 | A | 6/1974 | Horvath |
| 4,065,815 | A | 1/1978 | Sen-Jung |
| 4,569,352 | A | 2/1986 | Petrofsky et al. |
| 4,697,808 | A | 10/1987 | Larson et al. |
| 4,711,242 | A | 12/1987 | Petrofsky |
| 4,760,850 | A | 8/1988 | Phillips et al. |
| 4,781,180 | A | 11/1988 | Solomonow |
| 4,895,574 | A | 1/1990 | Rosenberg |
| 4,953,543 | A | 9/1990 | Grim et al. |
| 5,062,857 | A | 11/1991 | Berringer et al. |
| 5,090,138 | A | 2/1992 | Borden |
| 5,112,296 | A | 5/1992 | Beard et al. |
| 5,133,773 | A | 7/1992 | Sawamura et al. |
| 5,133,774 | A | 7/1992 | Sawamura et al. |
| 5,201,772 | A | 4/1993 | Maxwell |
| 5,282,460 | A | 2/1994 | Boldt |

(Continued)

FOREIGN PATENT DOCUMENTS

| | | |
|---|---|---|
| WO | 99/05991 | 2/1999 |
| WO | 01/65615 | 9/2001 |

(Continued)

OTHER PUBLICATIONS

Brooks, G.A., T.D. Fahey, and T.P. White, Exercise physiology: human bioenergetics and its applications. 2nd ed. 1996, Mountain View, Calif.: Mayfield Pub. iii, 750.

(Continued)

*Primary Examiner* — Michael Zarroli
(74) *Attorney, Agent, or Firm* — Oyen Wiggs Green & Mutala LLP

(57) ABSTRACT

An apparatus for harvesting energy from motion of a human or animal body segment and providing the energy to an electrical load is disclosed. The apparatus comprises a generator operatively coupled to the body segment such that particular movement of the body segment causes the generator to output a generator current and to oppose the particular movement of the body segment with a generator torque. An electrical load is coupled to receive the generator current. A control system is operatively connected between the generator and the electrical load and is configured to control the generator torque during the particular movement of the body segment. Corresponding methods are also disclosed.

49 Claims, 9 Drawing Sheets

(56) References Cited

U.S. PATENT DOCUMENTS

| | | |
|---|---|---|
| 5,344,446 A | 9/1994 | Sawamura et al. |
| 5,358,461 A | 10/1994 | Bailey et al. |
| 5,443,524 A | 8/1995 | Sawamura et al. |
| 5,476,441 A | 12/1995 | Durfee et al. |
| 5,571,205 A | 11/1996 | James |
| 5,616,104 A | 4/1997 | Mulenburg et al. |
| 5,628,722 A | 5/1997 | Solomonow et al. |
| 5,888,212 A | 3/1999 | Petrofsky et al. |
| 5,888,213 A | 3/1999 | Sears et al. |
| 5,893,891 A | 4/1999 | Zahedi |
| 5,917,310 A | 6/1999 | Baylis |
| 5,980,435 A | 11/1999 | Joutras et al. |
| 5,982,577 A | 11/1999 | Brown et al. |
| 5,992,553 A | 11/1999 | Morrison |
| 6,113,642 A | 9/2000 | Petrofsky et al. |
| 6,133,642 A | 10/2000 | Hutchinson |
| 6,281,594 B1 | 8/2001 | Sarich |
| 6,291,900 B1 | 9/2001 | Tiemann et al. |
| 6,293,771 B1 | 9/2001 | Haney et al. |
| 6,379,393 B1 | 4/2002 | Mavroidis et al. |
| 6,423,098 B1 | 7/2002 | Biedermann |
| 6,500,138 B1 | 12/2002 | Irby et al. |
| 6,517,503 B1 | 2/2003 | Naft et al. |
| 6,517,585 B1 | 2/2003 | Zahedi et al. |
| 6,610,101 B2 | 8/2003 | Herr et al. |
| 6,645,252 B2 | 11/2003 | Asai et al. |
| 6,673,117 B1 | 1/2004 | Soss et al. |
| 6,719,806 B1 | 4/2004 | Zahedi et al. |
| 6,755,870 B1 | 6/2004 | Biedermann et al. |
| 6,764,520 B2 | 7/2004 | Deffenbaugh et al. |
| 6,768,246 B2 | 7/2004 | Pelrine et al. |
| 6,770,045 B2 | 8/2004 | Naft et al. |
| 6,852,131 B1 | 2/2005 | Chen et al. |
| 6,910,992 B2 | 6/2005 | Arguilez |
| 6,911,050 B2 | 6/2005 | Molino et al. |
| 6,955,692 B2 | 10/2005 | Grundei |
| 6,966,882 B2 | 11/2005 | Horst |
| 7,021,978 B2 * | 4/2006 | Jansen .................. 440/6 |
| 7,029,500 B2 | 4/2006 | Martin |
| 7,045,910 B2 | 5/2006 | Kitamura et al. |
| 7,056,297 B2 | 6/2006 | Dohno et al. |
| 7,137,998 B2 | 11/2006 | Bedard |
| 7,147,667 B2 | 12/2006 | Bedard |
| 7,268,442 B2 * | 9/2007 | Syed et al. ........... 290/40 C |
| RE39,961 E | 12/2007 | Petrofsky et al. |
| 7,304,398 B1 | 12/2007 | Kim et al. |
| 7,314,490 B2 | 1/2008 | Bedard et al. |
| 7,367,958 B2 | 5/2008 | McBean et al. |
| 7,396,337 B2 | 7/2008 | McBean et al. |
| 7,402,915 B2 | 7/2008 | Hutchinson et al. |
| 7,410,471 B1 | 8/2008 | Campbell et al. |
| 7,429,253 B2 | 9/2008 | Shimada et al. |
| 7,431,737 B2 | 10/2008 | Ragnarsdottir et al. |
| 7,445,606 B2 | 11/2008 | Rastegar et al. |
| 7,485,152 B2 | 2/2009 | Haynes et al. |
| 7,652,386 B2 * | 1/2010 | Donelan et al. ........... 290/1 R |
| 7,797,096 B2 * | 9/2010 | Reynolds et al. ........... 701/101 |
| 7,948,100 B2 * | 5/2011 | Nies et al. ........... 290/44 |
| 2001/0029343 A1 | 10/2001 | Seto et al. |
| 2001/0029400 A1 | 10/2001 | Deffenbaugh et al. |
| 2002/0052663 A1 | 5/2002 | Herr et al. |
| 2003/0170599 A1 | 9/2003 | Hart |
| 2004/0039454 A1 | 2/2004 | Herr et al. |
| 2004/0049290 A1 | 3/2004 | Bedard |
| 2004/0059433 A1 | 3/2004 | Slemker et al. |
| 2004/0064195 A1 | 4/2004 | Herr |
| 2004/0072657 A1 | 4/2004 | Arguilez |
| 2004/0088057 A1 | 5/2004 | Bedard |
| 2004/0111163 A1 | 6/2004 | Bedard et al. |
| 2004/0181289 A1 | 9/2004 | Bedard et al. |
| 2004/0183306 A1 | 9/2004 | Rome |
| 2004/0186591 A1 | 9/2004 | Lang |
| 2005/0184878 A1 | 8/2005 | Grold et al. |
| 2006/0046907 A1 | 3/2006 | Rastegar et al. |
| 2006/0046908 A1 | 3/2006 | Rastegar et al. |
| 2006/0046909 A1 | 3/2006 | Rastegar et al. |
| 2006/0046910 A1 | 3/2006 | Rastegar et al. |
| 2006/0069448 A1 | 3/2006 | Yasui |
| 2006/0122710 A1 | 6/2006 | Bedard |
| 2006/0155385 A1 | 7/2006 | Martin |
| 2006/0249315 A1 | 11/2006 | Herr et al. |
| 2006/0260620 A1 | 11/2006 | Kazerooni et al. |
| 2007/0016329 A1 | 1/2007 | Herr et al. |
| 2007/0043449 A1 | 2/2007 | Herr et al. |
| 2007/0050044 A1 | 3/2007 | Haynes et al. |
| 2007/0056592 A1 | 3/2007 | Angold et al. |
| 2007/0233279 A1 | 10/2007 | Kazerooni et al. |
| 2008/0278028 A1 | 11/2008 | Donelan et al. |
| 2008/0288088 A1 | 11/2008 | Langenfeld et al. |
| 2009/0192619 A1 | 7/2009 | Martin et al. |
| 2012/0098265 A1 * | 4/2012 | Skaare ........... 290/53 |

FOREIGN PATENT DOCUMENTS

| | | |
|---|---|---|
| WO | 2004/019832 | 3/2004 |
| WO | 2006/078871 | 7/2006 |
| WO | 2006/113520 | 10/2006 |
| WO | 2007/025116 | 3/2007 |
| WO | 2007/103579 | 9/2007 |

OTHER PUBLICATIONS

Bussolari, S.R. and E.R. Nadel, The physiological limits of long-duration human power production-lessons learned from the Deadalus project. Human Power, 1989. 7(4): p. 1-16.

Nadel, E.R. and S.R. Bussolari, The Daedalus Project—Physiological Problems and Solutions. American Scientist, 1988. 76(4): p. 351-360.

Hamilton, B., FAQ: Automotive Gasoline. Retrieved May 12, 2005, from http://www.uvi.edu/Physics/SCI3xxWeb/Energy/GasolineFAQ.html.

Starner, T., Human-powered wearable computing. IBM Systems Journal, 1996. 35(3-4): p. 618-629.

ThermoAnalytics, I., Battery type and characteristics. Retrieved 10 Jun 2, 2005, from http://www.thermoanalytics.com/support/publications/batterytypesdoc.html.

Vogel, S., Prime mover: a natural history of muscle. 1st ed. 2001, New York: Norton. xi, 370 p.

Margaria, R., Biomechanics and energetics of muscular exercise. 1976, Oxford [Eng.]: Clarendon Press. x, 146 p.

Woledge, R.C., N. A. Curtin, and E. Homsher, Energetic aspects of muscle contraction. 1985, London; Orlando: Academic Press. xiii, 359.

Winter, D.A. and D.A. Winter, Biomechanics and motor control of human movement. 2nd ed. 1990, New York: Wiley. xvi, 277.

Enoka, R.M., Load-Related and Skill-Related Changes in Segmental Contributions to a Weightlifting Movement. Medicine and Science in Sports and Exercise. 1988. 20(2): p. 178-187.

Pugh, L.G., The influence of wind resistance in running and walking and the mechanical efficiency of work against horizontal or vertical forces. J Physiol, 1971. 213(2): p. 255-76.

Webb, P., et al., The Work of Walking—a Calorimetric Study. Medicine and Science in Sports and Exercise. 1988. 20 (4): p. 331-337.

Donelan, J.M., R. Kram, and A.D. Kuo, Mechanical and metabolic determinants of the preferred step width in human walking. Proceedings of the Royal Society of London Series B-Biological Sciences, 2001. 268(1480): p. 1985-1992.

Donelan, J.M., R. Kram, and A.D. Kuo, Mechanical work for step-to-step transitions is a major determinant of the metabolic cost of human walking. Journal of Experimental Biology, 2002. 205(Pt 23): p. 3717-27.

Donelan, J.M., R. Kram, and A.D. Kuo, Simultaneous positive and negative external mechanical work in human walking. Journal of Biomechanics, 2002. 35(1): p. 117-124.

(56) References Cited

OTHER PUBLICATIONS

Gonzalez, J.L., A. Rubio, and F. Moll. A prospect on the use of piezolelectric effect to supply power to wearable electronic devices. in ICMR. 2001. Akita, Japan.

Koerner, B.I., Rise of the Green Machine, in Wired. 2005.

Hof, A.L., et al., Speed dependence of averaged EMG profiles in walking. Gait & Posture, 2002. 16(1): p. 78-86.

Kokubo, T., et al., Bioactive metals: preparation and properties. J Mater Sci Mater Med, 2004. 15(2): p. 99-107.

Thompson, C., Battery not included. Why your laptop is always running out of juice, in Slate. 2004.

Starner, T. T and Paradiso, Human generated power for mobile electronics, in Low-power electronics design, C. Piguet, Editor. 2004, CRC Press: Boca Raton.

Paradiso, J.A. and T. Starner, Energy scavenging for mobile and wireless electronics, IEEE Pervasive Computing, 2005. 4(1): p. 18-27.

Whitt, F.R. and D.G. Wilson, Bicycling science. 2nd ed. 1982, Cambridge, Mass.: MIT Press. xviii, 364.

Shenck, N. S. and 1.A. Paradiso, Energy scavenging with shoe-mounted piezoelectrics. IEEE Micro, 200 1. 21(3): p. 30-42.

Kymissis, J., et al. Parasitic Power Harvesting in Shoes. in Second IEEE International Conference on Wearable Computing. 1998: IEEE Computer Society Press.

Antaki, J. F., et al., A gait-powered autologous battery charging system for artificial organs, Asaio J, 1995.41(3): p. M588-95.

Moll, F. and A. Rubio. An approach to the analysis of wearable body-powered systems. In MIXDES. 2000. Gdynia, Poland.

Drake, J., The greatest shoe on earth, in Wired. 2001. p. 90-100.

Soule, R.G. and R.F. Goldman, Energy Cost of Loads Carried on Head, Hands, or Feet. Journal of Applied Physiology, 1969.27(5): p. 687-&.

Niu, P., et al. Evaluation of Motions and Actuation Methods for Biomechanical Energy Harvesting. in 35th Annual IEEE Power Electronics Specialists Conference. 2004. Aachen, Germany: IEEE.

Saez, L.M., Energy Harvesting from Passive Human Power. PhD Thesis, Jan. 2004, from http://pmos.upc.es/blues/projects/thesis_project_mateu.pdf.

Rome, L.C. et al., Generating Electricity while Walking with Loads. Science, vol. 309, p. 1725-1728, Sep. 9, 2005.

* cited by examiner

METHODS AND APPARATUS FOR CONTROL OF BIOMECHANICAL ENERGY HARVESTING

TECHNICAL FIELD

This invention relates to methods and apparatus for the harvesting energy from the movement of humans and other animals (biomechanical energy harvesting). In particular, embodiments of the invention provide methods and apparatus for controlling biomechanical energy harvesting from moving body joints of humans and other animals.

BACKGROUND

Humans and other animals are a rich source of mechanical power. In general, this mechanical power is derived from chemical energy. The chemical energy required for a muscle or group of muscles to perform a given activity may be referred to as the "metabolic cost" of the activity. In humans and other animals, chemical energy is derived from food. Food is generally a plentiful resource and has a relatively high energy content. Humans and other animals exhibit a relatively high efficiency when converting food into chemical energy which then becomes available to muscles for subsequent conversion into mechanical energy. Mechanical power generated by humans and other animals can be efficient, portable and environmentally friendly.

As a consequence of the attractive characteristics of human power, there have been a variety of efforts to convert human mechanical power into electrical power, including:
- U.S. Pat. No. 1,472,335 (Luzy);
- U.S. Pat. No. 1,184,056 (Van Deventer);
- U.S. Pat. No. 5,917,310 (Baylis);
- U.S. Pat. No. 5,982,577 (Brown);
- U.S. Pat. No. 6,133,642 (Hutchinson);
- U.S. Pat. No. 6,291,900 (Tiemann et al.).

A subset of the devices used to convert human mechanical power into electrical power focuses on energy harvesting—the capture of energy from the human body during everyday activities. Examples of disclosures relating to energy harvesting include:
- Starner, T., Human-powered wearable computing. IBM Systems Journal, 1996. 35(3-4): 618-629;
- Chapuis, A. and E. Jaquet, The History of the Self-Winding Watch. 1956, Geneva: Roto-Sadag S. A.;
- Shenck, N. S. and J. A. Paradiso, Energy scavenging with shoe-mounted piezoelectrics. IEEE Micro, 2001. 21(3): 30-42;
- Kymissis, J., et al. Parasitic Power Harvesting in Shoes. in Second IEEE International Conference on Wearable Computing. 1998: IEEE Computer Society Press;
- Antaki, J. F., et al., A gait-powered autologous battery charging system for artificial organs. Asaio J, 1995. 41(3): M588-95;
- Gonzalez, J. L., A. Rubio, and F. Moll. A prospect on the use of piezolelectric effect to supply power to wearable electronic devices. in ICMR. 2001. Akita, Japan;
- Moll, F. and A. Rubio. An approach to the analysis of wearable body-powered systems. in MIXDES. 2000. Gdynia, Poland;
- Drake, J., The greatest shoe on earth, in Wired. 2001. p. 90-100;
- Niu, P., et al. Evaluation of Motions and Actuation Methods for Biomechanical Energy Harvesting. in 35th Annual IEEE Power Electronics Specialists Conference. 2004. Aachen, Germany: IEEE.
- U.S. Pat. No. 6,768,246 (Pelrine et al.);
- US patent publication No. US2004/0183306 (Rome);
- U.S. Pat. No. 6,293,771 (Haney et al.);

Energy may be harvested from the movement of body joints of humans and other animals by converting mechanical energy derived from such movement to electrical energy. Activities where body joints move cyclically, such as walking, jogging, and running, for example, present opportunities to continually harvest energy from moving body joints. In some energy harvesting apparatus and methods, a generator driven by joint motion is coupled to a constant electrical load. Since the instantaneous mechanical power of body joints during cyclical activities typically varies over the period of each cycle, both the electrical power supplied to the load and the forces applied to the body joint may be time-varying over each cycle. In some circumstances, the variations of delivered electrical power and/or forces applied to body joints that occur in this arrangement may be undesirable, for reasons such as efficiency and user comfort.

There is accordingly a desire for improved apparatus and methods for harvesting energy from cyclical motion of body joints of humans and other animals.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an apparatus for harvesting energy from motion of a human or animal body segment and providing the energy to an electrical load. The apparatus comprises: a generator operatively coupled to the body segment such that particular movement of the body segment causes the generator to output a generator current and to oppose the particular movement of the body segment with a generator torque; an electrical load coupled to receive the generator current; and a control system operatively connected between the generator and the electrical load, the control system configured to control the generator torque during the particular movement of the body segment.

In some embodiments, the control system is configured to control the generator torque during the particular movement of the body segment to track a torque control signal, the torque control signal representative of a desired generator torque.

Another aspect of the invention provides a method for harvesting energy from motion of a human or animal body segment and providing the energy to an electrical load. The method comprises: operatively coupling a to the body segment such that particular movement of the body segment causes the generator to output a generator current and to oppose the particular movement of the body segment with a generator torque; connecting an electrical load to receive the generator current; and controlling the generator torque during the particular movement of the body segment using a control system connected between the generator and the electrical load.

In some embodiments, controlling the generator torque during the particular movement of the body segment comprises controlling the generator torque to track a torque control signal, the torque control signal representative of a desired generator torque.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular embodiments of the invention provide systems, apparatus and methods for harvesting biomechanical energy from a body segment coupled to a generator which involve advantageously controlling the torque developed in the generator and experienced by the body segment during motion thereof. In some embodiments, generator torque may be controlled by controlling the current drawn from the generator. In some embodiments, the generator torque may be controlled to track a torque control signal representative of a desired torque.

Figure 1:
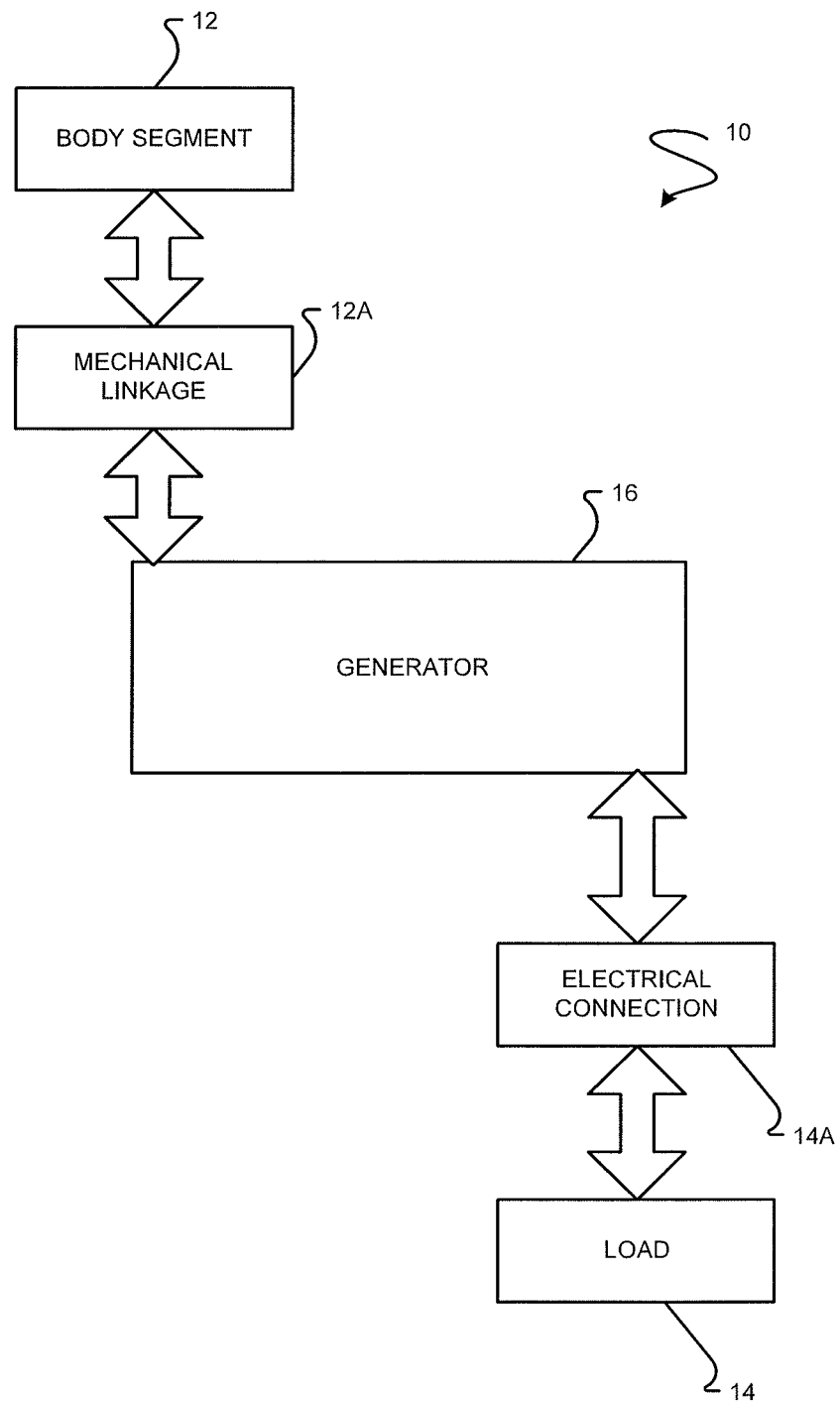
FIG. 1 is a schematic diagram of a prior art biomechanical energy harvesting system for harvesting mechanical energy from a moving body segment and providing harvested energy to an electrical load.

FIG. 1 is a schematic diagram of a prior art biomechanical energy harvesting system 10 for harvesting energy from a moving body segment 12 and providing the harvested energy to an electrical load 14. Energy harvesting system 10 comprises a generator 16. Body segment 12 is mechanically connected to generator 16 via mechanical linkage 12A and generator 16 is electrically connected to load 14 via electrical connection 14. In one particular embodiment, generator 16 comprises a rotary-magnetic brushless DC motor which outputs three phase electrical power, although this is not necessary. Those skilled in the art will appreciate that there are a relatively large variety of generators capable of converting mechanical power into electrical power. In general, generator 16 may comprise any suitably configured generator.

Body segment 12 may be operatively coupled to generator 16 via mechanical linkage 12A such that motion of body segment 12 causes generator 16 to generate electrical energy, as is known in the art. For example. motion of body segment 12 may cause a rotor (not shown) of generator 16 to move (e.g. turn) relative to a stator (not shown) of generator 16. Body segment 12 may comprise, for example, two limbs and a joint at which the limbs are connected. System 10 may be configured for harvesting energy from relative movement between two limbs about the joint (e.g., during flexion and/or extension of the joint), such as by having the rotor of generator 16 coupled to one body segment and the stator of generator 16 coupled to the other body segment.

Mechanical linkage 12A may comprise a mechanical connection, transmission, a clutch and/or the like, for example. In some embodiments, mechanical linkage 12A comprises a transmission that converts the relatively high-torque, low-speed mechanical power of body segment 12 into relatively low-torque, high-speed mechanical power suitable for use by generator 16. Non-limiting examples of couplings between body segment 12 and rotor 20 that may be used in mechanical linkage 12A are presented in published PCT Patent application No. WO/2007/016781.

When generator 16 is actuated (e.g. by body segment 12), an electro-motive force (emf) and corresponding current are induced in generator 16. This generator current may be delivered to load 14 via electrical connection 14A. As is known in the art, generation of electrical energy in generator 16 is associated with a torque (or force) which tends to act against the movement of the generator components relative to one another—e.g. in the case of a rotary generator, this generator torque may act against the movement of the generator rotor relative to the generator stator. This generator torque is proportional (at least as a first order approximation) to the current drawn from generator 16.

Where body segment 12 is connected such that the motion of body segment causes generator 16 to generate energy, the torque developed in generator 16 (which may be referred to herein as "generator torque") will always act to decelerate the motion of body segment 12. Mechanical linkage 12A between generator 16 and body segment 12 transmits this generator torque to body segment 12, so that the generator torque will be felt by the host human/animal to which body segment 12 belongs. For example, where body segment 12 comprises two limbs connected at a joint, this generator torque may manifest itself in the form of torque(s) that oppose limb motion. As discussed above, mechanical linkage 12A may comprise a transmission that may change the torque/speed characteristics of the generator torque as it is experienced by body segment 12 and by the host to which body segment 12 belongs.

In some circumstances (e.g. where body segment 12 is moved according to a pattern which may be cyclic or the like), it may be advantageous for body segment 12 to experience particular amounts of generator torque at different times during the motion. Non-limiting examples of advantages which may be obtained from judicious application of generator torque during patterned motion include improved efficiency, minimization of changes to the natural pattern of motion, and minimization of perceived interference with the natural pattern of motion.

Particular embodiments of the invention provide systems for harvesting biomechanical energy from a body segment coupled to a generator which involve advantageously controlling the generator torque during motion thereof. In some embodiments, generator torque may be controlled by controlling the current drawn from the generator.

Figure 2:
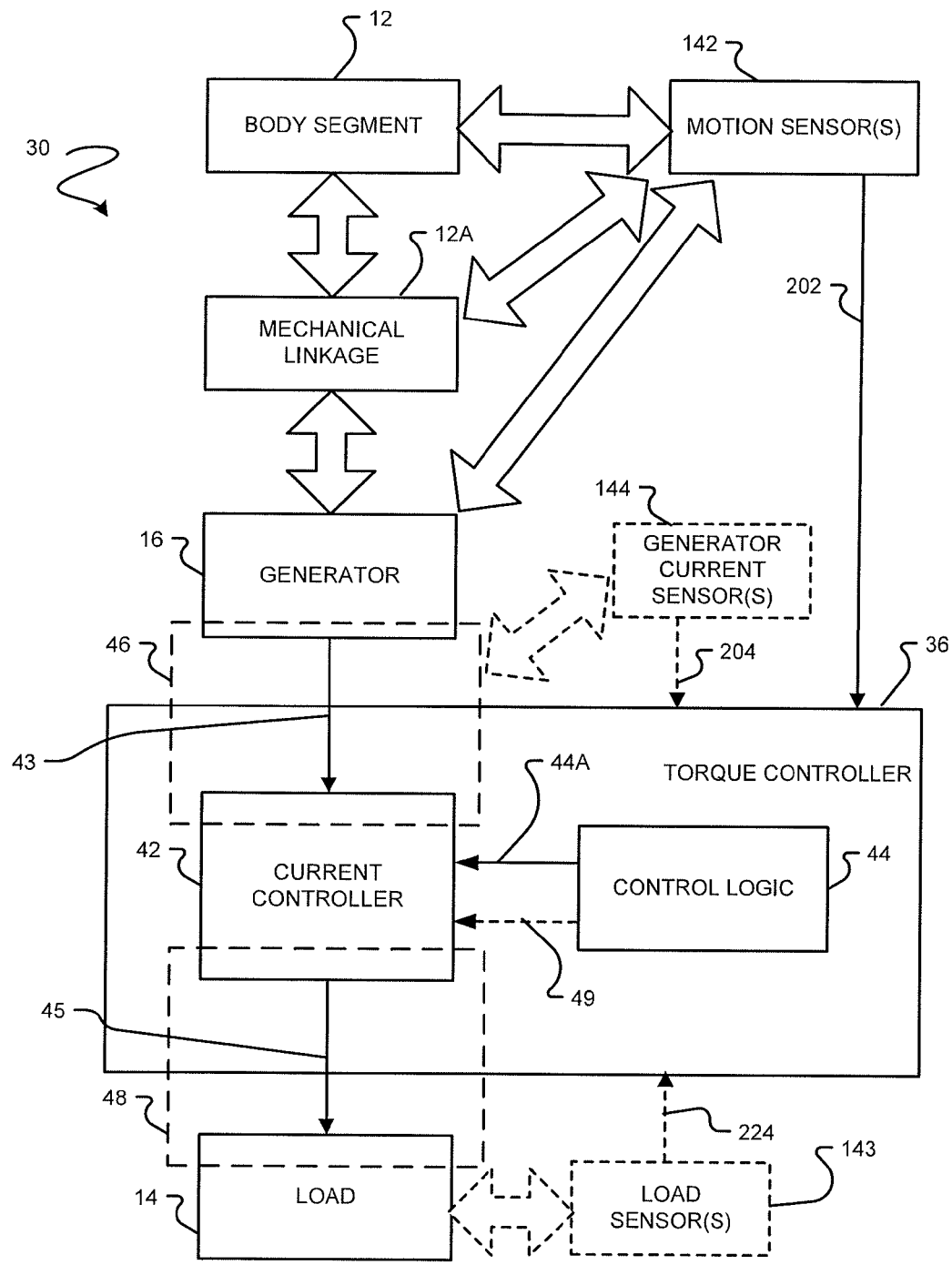
FIG. 2 is a schematic diagram of a biomechanical energy harvesting system according to an example embodiment for harvesting mechanical energy from a moving body segment coupled to a generator which incorporates a torque controller for controlling the generator generator torque.

FIG. 2 is a schematic diagram of a biomechanical energy harvesting system 30 according to an example embodiment for controlling the generator torque developed in a generator 16 coupled by mechanical linkage 12A to a body segment 12. The output of generator 16 is electrically connected to a torque controller 36 which may control the generator torque developed by generator 16. Torque controller 36 is electrically connected to an electrical load 14, and is configured to supply current from generator 16 to load 14. In particular embodiments, torque controller 36 comprises a current controller 42 which controls the current drawn from generator 16 and (since this current is at least approximately proportional to the generator torque) thereby controls the generator torque developed by generator 16. In addition to (or as a part of) controlling the generator current/torque developed by generator 16, torque controller 36 may perform the functions of electrical connection 14A (FIG. 1).

In the illustrated embodiment of FIG. 2, torque controller 36 comprises a current controller 42 and control logic 44. A generator circuit 46 provides the electrical connection between generator 16 and current controller 42. Generator circuit 46 comprises an input 43 to current controller 42 which may be electrically connected to the output of generator 16. Generator circuit 46 may also comprise other circuit components not expressly shown in the schematic diagram of FIG. 2 (e.g. rectifying circuits, amplifiers, signal conditioning circuits and/or the like). A load circuit 48 provides the electrical connection between current controller 42 and load 14. Load circuit comprises an output 45 from current controller 42 which may be electrically connected to load 14. Load circuit 48 may also comprise other circuit components not expressly shown in the schematic diagram of FIG. 2 (e.g. rectifying circuits, amplifiers, signal conditioning circuits and/or the like).

In the illustrated embodiment, torque controller 36 is configured to control the generator torque developed by generator 16 by controlling the current drawn from generator 16. In particular, current controller 42 controls the current drawn from generator 16 into generator circuit 46. The current drawn from generator 16 into generator circuit 46 may be referred to herein as "generator current". The generator current is proportional (at least as a first order approximation) to the generator torque developed by generator 16 and to the corresponding torques/forces experienced by body segment 12. Accordingly, when more generator current is drawn from generator 16, the generator torque may be higher and the host (to which body segment 12 belongs) may be more significantly impacted by the activity of energy harvesting system 30. Conversely, when less generator current is drawn from generator 16, the generator torque may be lower and the host will be less significantly impacted by the activity of energy harvesting system 30. It will also be appreciated that the amount of generator current drawn (and eventually provided to load 14 via current controller 42 and load circuit 48) impacts the amount of energy harvestable by system 30—e.g. for a given repetitive motion pattern of body segment 12, the amount of harvestable power may generally increase (e.g. up to some maximum) with increased generator current and may generally decrease with decreased generator current. In some embodiments, an effort is made to balance the competing objectives of harvesting maximum amounts of energy while minimizing the impact of energy harvesting system 30 on the host.

In the illustrated embodiment, torque controller 36 receives input signal(s) 202 from one or more motion sensor(s) 142 configured to detect various aspects of the motion of body segment 12, mechanical linkage 12A and/or generator 16. By way of non-limiting example, motion sensors 142 may comprise encoders, accelerometers, gyroscopes, one or more varieties of position sensors and/or the like. In particular embodiments, motion sensors 142 may detect one or more aspects of the motion of body segment 12 and provide motion sensor signals 202 which are indicative of the velocity of a portion body segment 12 and/or the angular velocity of a portion body segment 12 about a joint. In one particular embodiment, where body segment 12 comprises a knee joint, motion sensors 142 may provide a motion sensor signal 202 indicative of angular velocity about the knee joint. In other embodiments, motion sensors 142 may indicate some other aspect of motion of body segment 12. By way of non-limiting example, motion sensors 142 may comprise one or more accelerometers configured to detect heel strike—i.e. the phase during gait when the subject's heel strikes the ground.

In particular embodiments, motion sensors 142 comprise one or more sensors for detecting a frequency of a voltage output signal from generator 16 which may be correlated with one or more aspects (e.g. the velocity) of the motion of body segment 12. For example, as discussed above, generator 16 may output three phase electrical power and corresponding voltage signals. Motion sensor(s) 142 may detect a frequency of the voltage signal associated with one or more of these phases. This frequency may be correlated with (e.g. proportional to) the velocity of motion of body segment 12. In one particular embodiment, the three phase voltage signals output by generator 16 are rectified, and filtered to remove ripple yielding a voltage output corresponding to the envelope of the angular velocity of generator 16. This envelope is divided in two to provide an envelope midpoint. One or more of the three phase voltage signals output by generator 16 may then be compared with the envelope midpoint to produce one or more corresponding digital signals whenever one of the phase voltage signals crosses the envelope midpoint. The edge-to-edge time of one or more of these digital signals may be measured to give the magnitude of their respective periods and inverted to get the frequency of generator 16. The frequency of generator 16 is directly proportional to the angular velocity of generator 16 and similarly correlated with (e.g. proportional to) the angular velocity about the knee joint (e.g. of body segment 12). It will be appreciated that any one of the phase voltage signals output from generator 16 could be used to determine the magnitude of the angular velocity of body segment 12 or that a suitable combination (e.g. an average) of the angular velocities estimated from each phase voltage signal could be used. The direction of the angular velocity of body segment 12 may be given by examining the sequence of the three digital signals corresponding to the three phase voltage signals output from generator 16.

Sensor signals 202 output from motion sensor(s) 142 may be conditioned by suitable signal conditioning circuitry (not shown) before or after being provided to torque controller 36.

In the illustrated embodiment, torque controller 36 also optionally receives a feedback signal 204 reflective of generator current 43 drawn from generator 16. In some embodiments, generator current feedback signal 204 may be provided by one or more current sensor(s) 144. In other embodiments, generator circuit 46 may be designed to provide generator current feedback signal 204 (e.g. without the need for separate current sensor(s) 144). In some embodiments, current sensor(s) 144 may detect, and/or generator current feedback signal 204 may be reflective of, the generator current drawn from generator 16 after rectification—i.e. generator current feedback signal 204 may be reflective of a DC generator current level. In the illustrated embodiment, torque controller 36 also optionally receives a load voltage feedback signal 224 reflective of the voltage (and/or charge level) at load 14. In some embodiments, load voltage feedback signal 224 may be provided by one or more load sensor(s) 143, which may sense the temperature, voltage and/or some other parameter of load 14 associated with its level of charge. In other embodiments, load circuit 48 may be designed to provide load voltage feedback signal 224 (e.g. without the need for separate load sensor(s) 143).

In the illustrated embodiment, current controller 42 controls the generator current based at least in part on a torque control signal 44A (which may also be referred to as a torque reference signal 44A). For example, current controller 42 may attempt to cause the generator current (or a corresponding generator torque which is at least approximately proportional to the generator current) to track torque control signal 44A. In the illustrated embodiment, torque control signal 44A is generated by control logic 44 and may be indicative of a magnitude of the desired generator torque to be developed in generator 16 and/or a magnitude of the desired generator current to be drawn from generator 16. Control logic 44 may comprise one or more suitably configured central processing units (CPU), one or more microprocessors, one or more microcontrollers, one or more field-programmable gate arrays (FPGA), application-specific integrated circuits (ASIC), logic circuits, combinations thereof or any other suitable processing unit(s) comprising hardware and/or firmware and/or software capable of functioning as described herein. In some embodiments, control logic 44 may be implemented in the analog domain by a suitably designed analog control circuit. Control logic 44 and the generation of torque control signal 44A are described in more detail below.

In the illustrated embodiment, current controller 42 may also optionally control the generator current (or the corresponding generator torque which may be at least approximately proportional to the generator current) based on optional voltage control signal 49. For example, current controller 42 may attempt to cause the voltage (and/or the charge) at load 14 to track voltage control signal 49 or current controller 42 may limit the output voltage of generator 16 to a level indicated by voltage control signal 49. In the illustrated embodiment, voltage control signal 49 is generated by control logic 44 and may be indicative of a magnitude of the desired voltage at load 14.

In some embodiments, current controller 42 is configured to control the generator current drawn from generator 16 (or the corresponding generator torque) by intermittently coupling power from generator circuit 46 to load circuit 48. For example, current controller 42 may be configured to intermittently electrically connect and disconnect generator circuit 46 and load circuit 48 and vary the generator current using duty cycle control or pulse-width modulated control.

In some embodiments, current controller 42 is configured to control the amount of generator current/torque based on a generator current feedback signal 204 which may be provided by one or more current sensors 144 and/or which may be obtained directly from generator output circuit 46. Generator current feedback signal 204 may be indicative of an instantaneous generator current/torque or of a time average generator current/torque. By way of non-limiting example, current controller 42 may be configured to control the generator current/torque based on a difference between a generator current feedback signal 204 and torque control signal 44A from control logic 44. In some embodiments, current controller 42 may control the generator current/torque based on a moving-window time average of the generator current feedback signal 204. In some embodiments, generator current feedback signal 204 may be time averaged in some manner prior to being provided to torque controller 36. In other embodiments, generator current feedback signal 204 may be provided to control logic 44 and control logic 44 may generate torque control signal 44A based at least in part on generator current feedback signal 204. In such embodiments, current controller 42 may not determine a difference between generator current feedback signal 204 and torque control signal 44A.

In some embodiments, current controller 42 is optionally configured to control the amount of generator current/torque based on a load voltage feedback signal 224 which may be provided by one or more optional load sensor(s) 143 and/or which may be obtained directly from current controller output circuit 48. Load voltage feedback signal 224 may be indicative of an instantaneous or time-averaged load voltage, load temperature or some other indicated of the state of charge of load 14. By way of non-limiting example, current controller 42 may be configured control the generator current/torque based on a difference between a load voltage feedback signal 224 and voltage control signal 49 from control logic 44. In some embodiments, current controller 42 may control the generator current/torque based on a moving-window time average of the load voltage feedback signal 224. In some embodiments, load voltage feedback signal 224 may be time averaged in some manner prior to being provided to torque controller 36. In other embodiments, a so-called "smart battery" may be used in load 14 which can provide a signal indicative of one or more desired charging parameters—e.g. desired charging current and/or charging voltage. In such embodiments, voltage control signal 49 could originate from the smart battery rather than control logic 44. In other embodiments, load voltage feedback signal 224 may be provided to control logic 44 and control logic 44 may generate voltage control signal 49 based at least in part on generator current feedback signal 204. In such embodiments, current controller 42 may not determine a difference between voltage feedback signal 224 and voltage control signal 49.

Figure 2A:
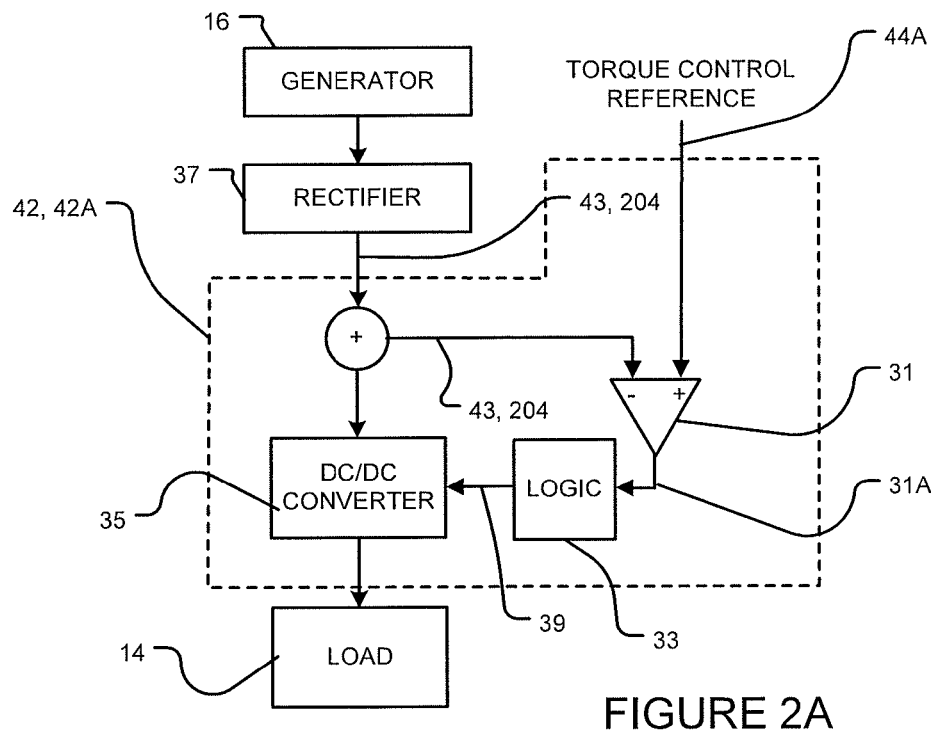
FIG. 2A schematically depicts a current controller according to a particular embodiment which may be used as part of the FIG. 2 energy harvesting system.

FIG. 2A schematically depicts a current controller 42A according to a particular embodiment. Current controller 42A may be used as, or as part of, current controller 42 of energy harvesting system 30 (FIG. 2). In the illustrated embodiment of FIG. 2A the output of generator 16 is rectified by rectifying circuit 37 before being provided as input 43 to current controller 42. In some embodiments, rectifying circuit 37 may be part of generator 16 or generator 16 may otherwise comprise a DC generator which provides DC output current. In other embodiments, rectifying circuit 37 may be part of current controller 42A. In the description below, the output current of rectifier circuit 37 (which is provided as input 43 to current controller 42A) may be referred to as generator current 43, it being understood that the output current of rectifier circuit 37 is correlated with the output current of generator 16. In the illustrated embodiment, generator current 43 is sensed or otherwise used to create generator current feedback signal 204.

As shown in FIG. 2A, generator current 43 is provided as an input signal to a controllable switch mode DC-to-DC converter 35. The operation of DC-to-DC converter 35 may be controlled by a DC/DC control signal 39. DC/DC control signal 39 may be determined by logic component 33, and, in the illustrated embodiment, is based on a difference 31A between torque control signal 44A (received from control logic 44 (FIG. 2)) and a generator current feedback signal 204 indicative of generator current signal 43. Difference signal 31A may be provided by a differential amplifier 31 or the like. Logic circuit 33 may comprise suitable logic circuitry for converting difference signal 31A into a DC/DC control signal 39 usable by DC-to-DC converter 35. For example, logic circuit 33 may convert difference signal 31 into a suitable signal for controlling DC-to-DC converter 35 using duty cycle control as described above. Logic circuit 33 may comprise one or more suitably configured central processing units (CPU), one or more microprocessors, one or more microcontrollers, one or more field-programmable gate arrays (FPGA), application-specific integrated circuits (ASIC), digital and/or analog logic circuits, combinations thereof or any other suitable processing unit(s) comprising hardware and/or firmware and/or software capable of functioning as described herein. In some embodiments, DC-DC converter 35 comprises a switch-mode DC-DC converter with a switching frequency that switches relatively fast in comparison to the torque control reference signal 44A (e.g. an order of magnitude greater). By way of non-limiting example, in a scenario where body segment comprise a knee joint involved in a walking motion, the time constants associated with torque control signal may be on the order of tens of milliseconds and the switching period of DC-DC converter 35 may be less than 100 µs.

Figure 2B:
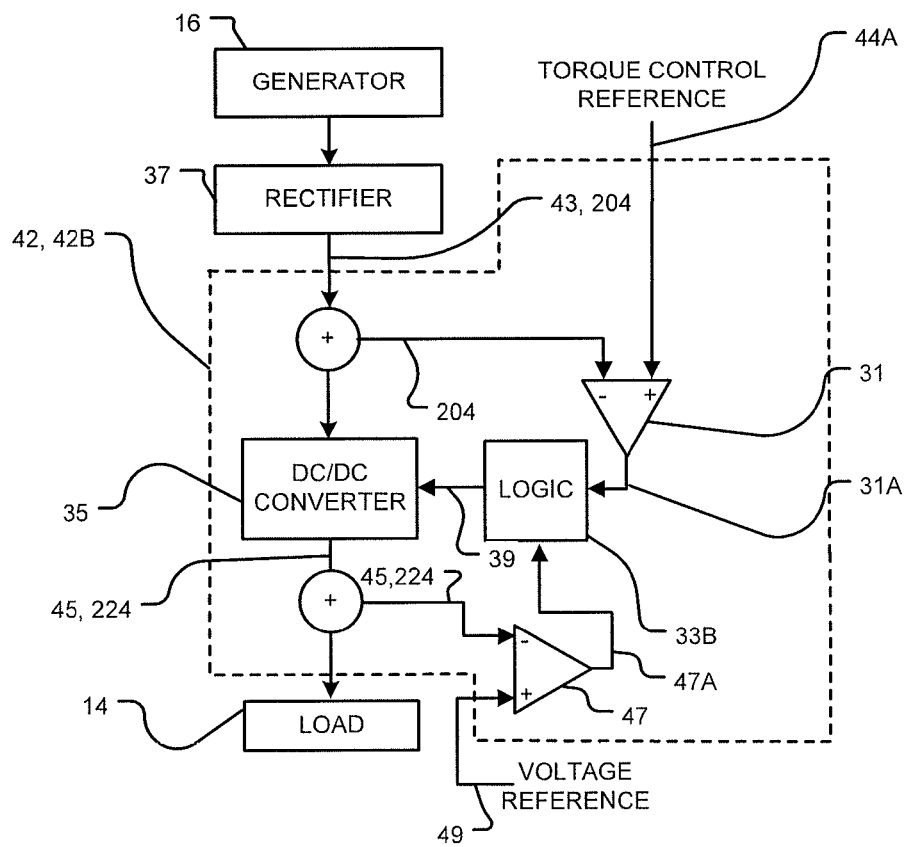
FIG. 2B schematically depicts a current controller according to a particular embodiment which may be used as part of the FIG. 2 energy harvesting system.

FIG. 2B schematically depicts a current controller 42B according to a particular embodiment. Current controller 42B may be similar in many respects to current controller 42A (FIG. 2A) and may be used as, or as a part of, current controller 42 of energy harvesting system 30 (FIG. 2). Current controller 42B differs from current controller 42A in that current controller 42B also takes the voltage and/or state of charge of load 14 into account when controlling generator current 43 and corresponding generator torque. More particularly, current controller 42B includes a load voltage feedback signal 224 which may be indicative of a voltage and/or state of charge of load 14 (e.g. in the case where load 14 comprises one or more batteries). In the illustrated embodiment, load voltage feedback signal 224 is sensed or otherwise detected from output signal 45 of DC-DC converter 35. Differential amplifier 47 produces a voltage difference signal 47A based on a difference between load voltage feedback signal 224 and a voltage control signal 49.

Logic circuitry 33B of current controller 42B may differ from logic circuitry 33 of current controller 42A in that logic circuitry 33B may be configured to generate DC/DC control signal 39 based on some combination of generator current difference signal 31A (i.e. the tracking of torque control signal 44A) and voltage difference signal 47A (i.e. the tracking of voltage control signal 49). In one particular embodiment, discussed in more detail below, logic circuitry 33B is configured to select the lesser of generator current difference signal 31A and voltage difference signal 47A and to output DC/DC control signal 39 on the basis of this selection. Thus, logic circuitry 33B may control DC/DC converter 35 with a DC/DC control signal 39 that is based on the lesser of the error 31A associated with the tracking of torque control signal 44A and the error 47A associated with the tracking of voltage control signal 49. As described in more detail below, torque control signal 44A may be based on one or more objectives associated with energy harvesting and user configurability while voltage control signal 49 may be associated with the ability of load 14 to accept charge.

Current controller 42 may provide relatively rapid and precise control over the magnitude of the generator current and consequently over the magnitude of the generator torque experienced by body segment 12. In some embodiments, current controller 42 is configured to provide substantially continuous control (e.g., analog or appropriately fine digital control) over the generator current and corresponding generator torque. Appropriately fine digital control may involve the use of control intervals with temporal periods less than 1% of the periods associated with repetitive movements of body segment 12. Advantageously, rapid and precise control over the magnitude of the generator torque developed by generator 16 may permit the generator torque to be controlled according to a pattern that yields an advantageous compromise between energy harvesting and effect on the host to which body segment 12 belongs.

During many cyclical or repetitive activities, like walking and running (in the example where body segment 12 comprises some part of the leg (e.g. the knee joint)), generator torque developed by generator 16 in harvesting will affect the host differently at different times or at different phases of the repetitive motion. As result, it may be advantageous to control the generator torque developed by generator 16 (and the corresponding energy harvesting) to be different at different times or phases of a cyclical activity. In some embodiments, such control may be provided by control logic 44 and torque control signal 44A (FIG. 2). In some embodiments, control of generator torque may be effected by controlling the corresponding generator current, which (as discussed above) may be at least approximately proportional to generator torque.

Figure 3:
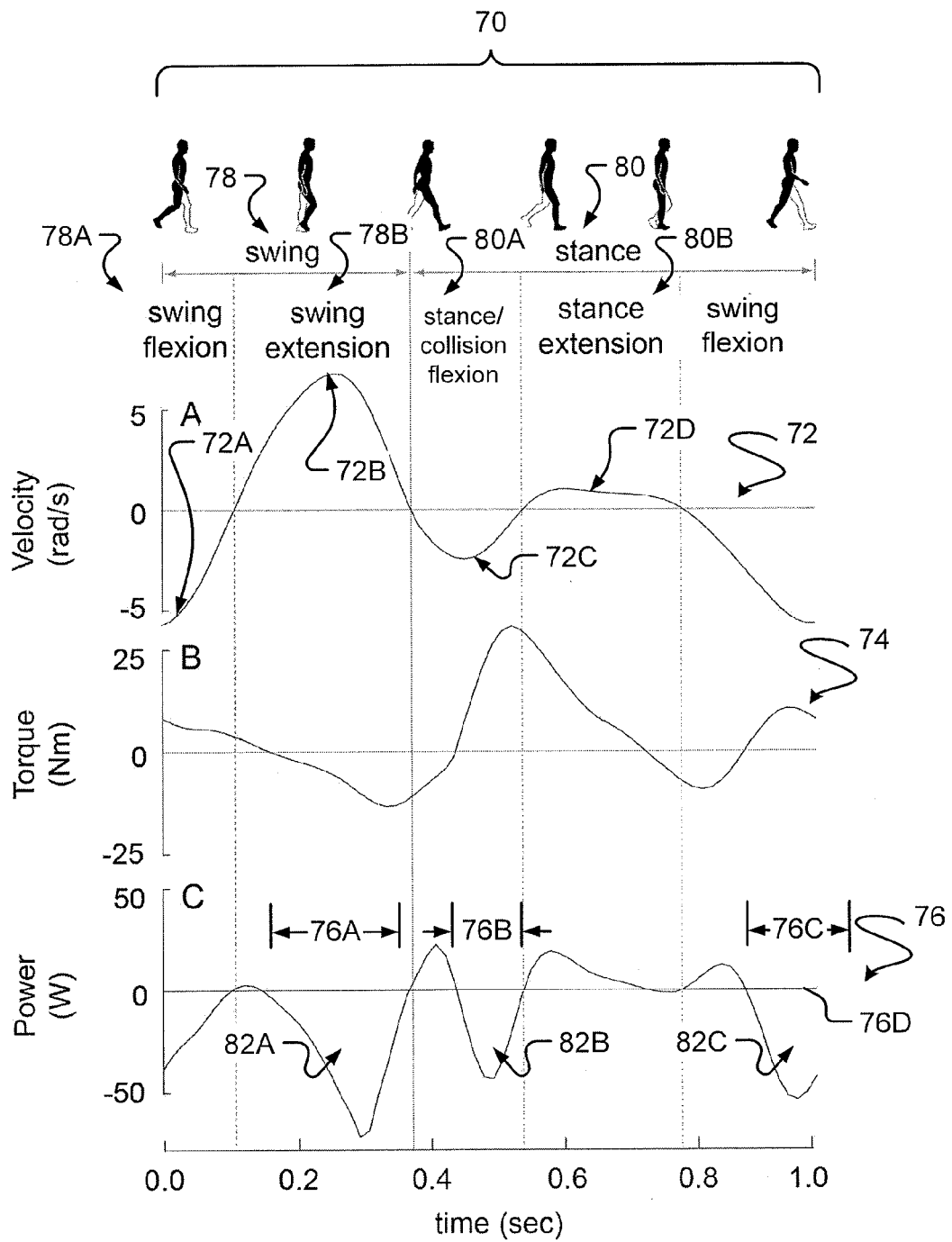
FIG. 3 shows plots of angular velocity, torque and mechanical power which are representative of various quantities relating to typical dynamics of knee joint during a walking gait cycle.

FIG. 3 includes plots that are representative of various quantities relating to typical dynamics of knee joint during a walking gait cycle 70:

plot 72 represents the angular velocity of the knee joint (i.e. the time derivative of the angle of the knee joint), where positive angular velocity represents movement in the knee extension direction and negative angular velocity represents movement in the knee flexion direction;

plot 74 represents the moment of the knee joint, where a positive moment represents torque in the extension direction and a negative moment represents torque in the flexion direction; and plot 76 represents the mechanical power associated with movement of the knee joint, where positive mechanical power represents power that increases the mechanical energy of the knee. Mechanical power (plot 76) represents the product of the torque (plot 74) and the angular velocity (plot 72) of the knee joint. The integral of the mechanical power (plot 72) represents the mechanical work performed by the knee joint.

Figure 4A:
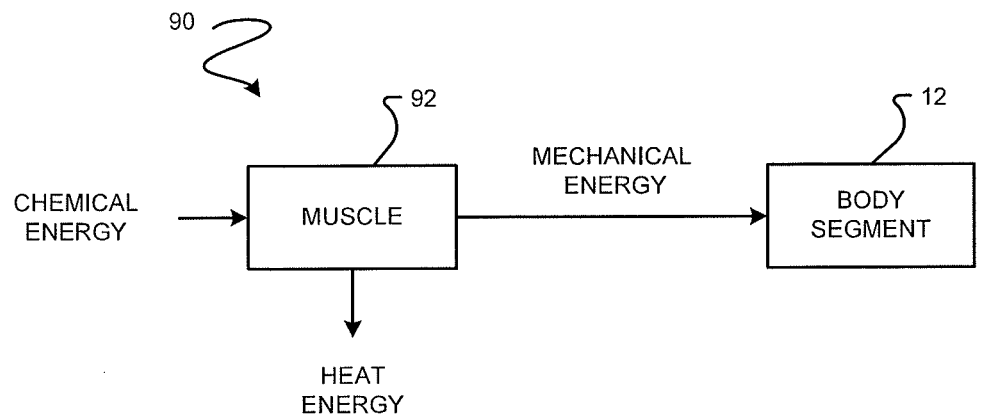
FIG. 4A schematically depicts the operation of muscles and an associated body segment in a positive mechanical power mode.

Referring to FIG. 3, gait cycle 70 may generally be divided into a swing portion 78, during which the foot corresponding to the illustrated knee is off of the ground and a stance portion 80, during which the foot corresponding to the illustrated knee is on the ground. Swing portion 78 may be further divided into a swing flexion portion 78A, during which the knee is flexing, and a swing extension portion 78B, during which the knee is extending. Stance portion 80 may be further divided into a stance/collision flexion portion 80A, during which the knee is flexing, and a stance extension portion 80B, during which the knee is extending. During one gait cycle 70, angular velocity plot 72 comprises extrema 72A, 72B, 72C, 72D which occur, respectively, in swing flexion portion 78A, swing extension portion 78B, stance/collision flexion portion 80A and stance extension portion 80B. These extrema correspond to the end of acceleration of the knee joint and peak mechanical energies in their respective portions.

Where mechanical power of the knee joint is positive (i.e. above axis 76D), muscles are acting to increase the mechanical energy associated with movement of the knee joint. Muscles acting to increase mechanical energy may be said to be operating in positive mechanical power mode. FIG. 4A schematically depicts a muscle 92 operating in positive mechanical power mode 90. In positive mechanical power mode 90, muscles 92 generate mechanical energy which is provided to one or more associated body segment(s) 12 and which typically results in acceleration of body segment(s) 12 (e.g., acceleration of limbs connected at a joint). In positive mechanical power mode 90, muscle 92 converts chemical energy into mechanical energy of associated body segment 12.

As discussed above, the generator torque developed by generator 16 is associated with the generation of electrical energy by generator 16 and always counteracts (e.g. tends to decelerate) motion of body segment 12. Consequently, the generator torque acts against (e.g. antagonizes) muscles operating on body segment 12 in positive mechanical power mode, thereby increasing the work that must be done by the muscles to move body segment 12. Harvesting energy from the movement of a body segment when muscles associated with a body segment are operating in a positive mechanical power mode may be referred to herein as "non-mutualistic" energy harvesting, since the generator torque associated with such energy harvesting acts against muscles and generally increases the metabolic cost (i.e. chemical energy) of the associated body segment motion.

Where mechanical power associated with the movement of the knee joint is negative (i.e. below axis 76D), muscles are acting to decrease (dissipate) the mechanical energy of the knee joint and cause corresponding deceleration of the knee joint. In plot 76, muscles are acting to decrease the mechanical energy of the knee joint in negative power intervals 76A, 76B and 76C of power plot 76. In interval 76A, knee flexor muscles are acting against the extension that occurs during swing extension in order to arrest extension of the knee prior to heel strike. In interval 76B, knee extensor muscles are acting against the flexion that occurs during stance/collision flexion when the mass of the human is transferred to the foot shortly after heel strike. In interval 76C, knee extensor muscles are acting against the flexion that occurs during swing flexion in order to arrest flexion of the knee prior to the start of swing extension.

Figure 4B:
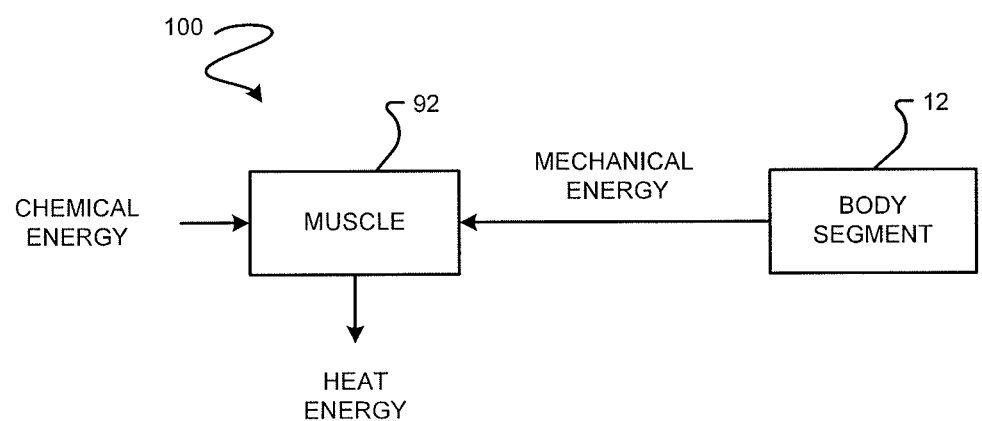
FIG. 4B schematically depicts the operation of muscles and an associated body segment in a negative mechanical power mode.

Muscles acting to decrease mechanical energy may be said to be operating in negative mechanical power mode. FIG. 4B schematically depicts a muscle 92 operating in negative mechanical power mode 100. In negative mechanical power mode 100, muscle 92 generates mechanical energy which typically results in deceleration (i.e., braking the motion of) the associated body segment(s) 12. In negative mechanical power mode, muscle 92 uses chemical energy to reduce the mechanical energy of the associated body segment.

Since the generator torque developed by generator 16 acts to decelerate the motion of body segment 12, the generator torque aids muscles operating on body segment 12 in negative mechanical power mode. Harvesting energy from the movement of a body segment when muscles associated with a body segment are operating in a negative mechanical power mode may be referred to herein as "mutualistic" energy harvesting, since it aids muscles and generally reduces the metabolic cost of the associated body segment motion.

In some embodiments, control logic 44 is configured to generate torque control signal 44A (FIG. 2), which, when tracked by current controller 42, controllably draws a current from generator 16 to cause system 30 to harvest energy mutualistically. For example, control logic 44 may be configured to generate torque control signal 44A which causes current controller 42 to draw relatively low (or even zero) generator current (and generate relatively low power) when muscles associated with the movement of body segment 12 are operating in positive mechanical mode and relatively high generator current (and generate relatively high power) when these muscles are operating in negative mechanical power mode.

In some embodiments, control logic 44 is configured to preferentially harvest energy mutualistically by synchronizing energy harvesting (and corresponding development of generator torque) to negative power modes of body segment 12. In some such embodiments, control logic 44 achieves such synchronization based on one or more sensed characteristics of the motion of the host to which body segment 12 belongs. For example, control logic 44 may synchronize energy harvesting (and corresponding development of generator torque) to particular gait phase ranges, which it determines based on one or more sensed characteristics of the motion of the host to which body segment 12 belongs.

In some embodiments, control logic 44 is configured to generate a more general torque control signal 44A in accordance with any desired characteristic or outcome.

Figure 5:
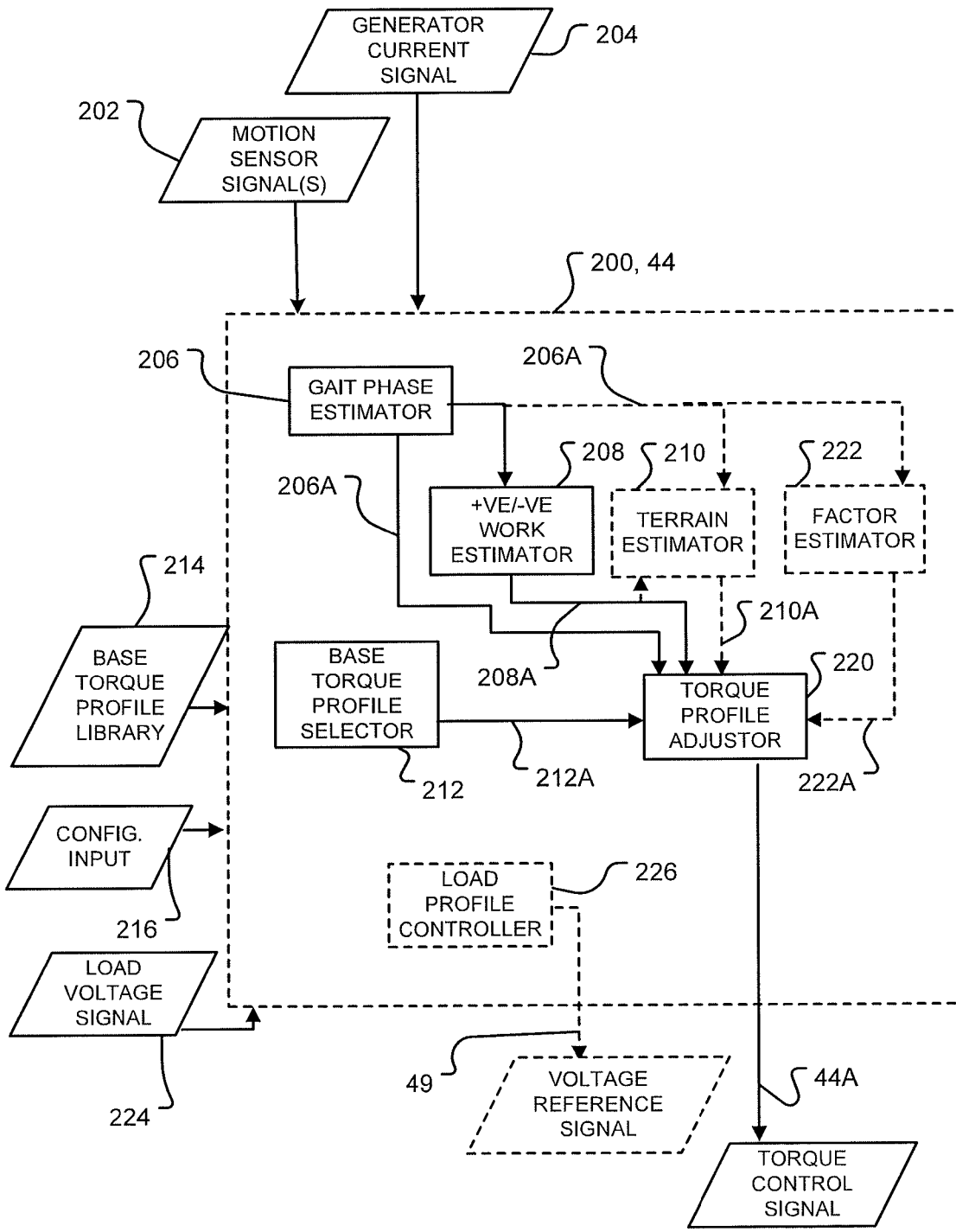
FIG. 5 schematically depicts control logic according to a particular embodiment which may be used as part of the FIG. 2 energy harvesting system.

FIG. 5 is a schematic illustration of control logic 200 according to a particular embodiment. Control logic 200 may be used as, or as a part of, control logic 44 of energy harvesting system 30 (FIG. 2) and may be used to determine torque control signal 44A discussed above. As mentioned briefly above and discussed in more detail below, in some embodiments, control logic 200 may also be used to determine optional voltage control signal 49. In the illustrated embodiment, control logic 200 receives a number of inputs, which include: motion sensor signal(s) 202 (e.g. from motion sensor(s) 142) indicative of one or more aspects of the motion of body segment 12; generator current signal 204 (e.g. from generator current sensor(s) 144) indicative of the current output of generator 16; load voltage signal 224 (e.g. from load sensor(s) 143) indicative of the voltage and/or state of charge of load 14; a base torque profile library input 214; and a configuration input 216. It will be appreciated that some of these inputs are optional—i.e. in some embodiments, all of these inputs are not necessary and control logic 200 may be able to perform some or all of its functions with a subset of these inputs. Further, it will be appreciated that in other embodiments, control logic 200 may be provided with one or more additional inputs which may be used to perform particular functions.

In the illustrated embodiment, control logic 200 is associated with energy harvesting system 30 wherein body segment 12 comprises a knee joint and where energy is harvested from the repetitive motion of body segment 12 associated with walking or running (i.e. from the gait of the host to which body segment 12 belongs). It will be appreciated, however, that energy harvesting systems 30 according to other embodiments could be configured for use with other body segments 12 or for other forms of motion of such body segments. In such embodiments, suitable modifications may be provided to control logic 200.

In the illustrated embodiment where body segment 12 comprises a knee joint and energy is harvested from the gait of the host to which body segment 12 belongs, control logic 200 comprises a gait phase estimator 206. Gait phase estimator 206 generates a gait phase estimate signal 206A indicative of the current phase of the gait of body segment 12 (e.g. the x-axis location in the FIG. 3 exemplary gait cycle 70). Gait phase estimator 206 may use information from motion sensor signal(s) 202 to generate its gait phase estimate signal 206A. As discussed above, in some embodiments, motion sensor signal(s) 202 may comprise the three phase voltage output signals from generator 16 which may be used to estimate the angular velocity of generator 16 and the corresponding angular velocity of body segment 12. Gait phase estimator 206 may use this angular velocity information to generate gait phase estimate signal 206A. In some embodiments, gait phase estimator 206 may also make use of other inputs (e.g. generator current feedback signal 204 or other inputs from other sensors (not shown)) to generate its gait phase estimate signal 206A.

In some embodiments, it is not necessary to precisely estimate the gait phase—i.e. it is not necessary to precisely estimate the x-axis location in the FIG. 3 exemplary gait cycle 70. In some embodiments, gait phase estimator 206 may additionally or alternatively estimate whether the current gate phase is within one of the particular portions of a gait cycle 70 which span a range of gait phases—e.g. whether the knee joint is in swing flexion, swing extension, stance/collision flexion or stance extension. In one particular embodiment, gait phase estimator 206 may determine the transitions between gait phase portions and output information in gait phase estimate signal 206A indicating that a transition has occurred between gait portions. In some embodiments, control logic 200 may operate in the form of a finite state machine that has states which correspond to the portions of repetitive motion (e.g. portions of gait cycle 70) of body segment 12.

There are many suitable techniques for estimating gait phase that may be used by gait phase estimator 206. Such techniques use a wide variety of motion sensors and corresponding motion sensor signals to estimate gait phase. Any such techniques could be used by gait phase estimator 206 in particular embodiments. Suitable exemplary and non-limiting techniques for gait phase estimation are described in: WO2007/016781; Li, Q., Young, M., Naing, V., & Donelan, J. M. (2010). Walking speed estimation using a shank-mounted inertial measurement unit Journal of biomechanics, 43(8), 1640-1643; Jasiewicz, J. M., Allum, J. H., Middleton, J. W., Barriskill, A., Condie, P., Purcell, B., Li, R. C., 2006. Gait event detection using linear accelerometers or angular velocity transducers in able-bodied and spinal-cord injured individuals. Gait Posture 24 (4), 502-509; and Sabatini, A. M., Martelloni, C., Scapellato, S., Cavallo, F., 2005. Assessment of walking features from foot inertial sensing. IEEE Transactions on Biomedical Engineering 52 (3), 486-494; all of which are hereby incorporated herein by reference.

It will be appreciated that gait phase estimator 206 is specific to situations where repetitive motion of body segment 12 is associated with gait. In other embodiments, where the repetitive motion of body segment 12 is different, gait phase estimator 206 may be replaced by a different phase estimator block, which may be used to estimate the phase of the different repetitive motion. In some embodiments, such phase estimator blocks may be particular to the particular type of repetitive motion of body segment 12.

Control logic 200 of the FIG. 5 embodiment also comprises a positive/negative work estimator 208 attempts to determine whether the motion of body segment 12 is in a positive or negative mechanical power mode (i.e. if energy harvesting conditions are mutualistic (negative mechanical power mode) or non-mutualistic (positive mechanical power mode). The output of positive/negative work estimator 208 may be provided as output signal 208A which may be indicative of whether body segment 12 is operating in a positive or negative mechanical power mode. Positive/negative work estimator 208 may make use of a variety of information to ascertain whether the motion of body segment 12 is in a positive or negative mechanical power mode. By way of non-limiting example, such information may include gait phase estimate signal 206A, motion sensor signal(s) 202 and/or generator current feedback signal 204. In one particular non-limiting example, positive/negative work estimator 208 may use gait phase estimator signal 206A to determine the time of transitions between portions of a host's gait cycle and then estimate that negative power region 76A (FIG. 3) would start at the conclusions of a delay period after a swing-flexion-to-swing-extension transition and last until a swing-extension-to-stance/collision-flexion transition. The length of the delay after the swing-flexion-to-swing-extension transition may be estimated by positive/negative work estimator 208 based a historical period of the swing extension portion of a host's gait which may also be determined from gait phase estimate signal 206A. Suitable exemplary techniques for estimating whether motion of body segment 12 is in a positive or negative mechanical power mode are described in WO2007/016781.

Control logic 200 of the FIG. 5 embodiment also comprises an optional terrain estimator 210 which may be used in embodiments where body segment 12 includes a portion of the host's body associated with locomotion (e.g. the host's knee or ankle joint). Terrain estimator may attempt to ascertain whether the motion of body segment 12 is being influenced by the terrain being traversed by the host. The output of terrain estimator 210 may be provided as output signal 210A, which may include, for example, an indication of the angular grade of the terrain being traversed by the host. Terrain estimator 210 may make use of a variety of information to generate terrain estimate signal 210A. By way of non-limiting example, such information may include gait phase estimate signal 206A, positive/negative power mode signal 208A, motion sensor signal(s) 202 and/or generator current feedback signal 204 which may be analyzed over the past number of gait cycles, for example. Detecting terrain and slope types may be desirable to optimize energy harvesting during specific phases or portions of the gait, or to increase user comfort during more intense locomotion over difficult terrain.

Figure 6:
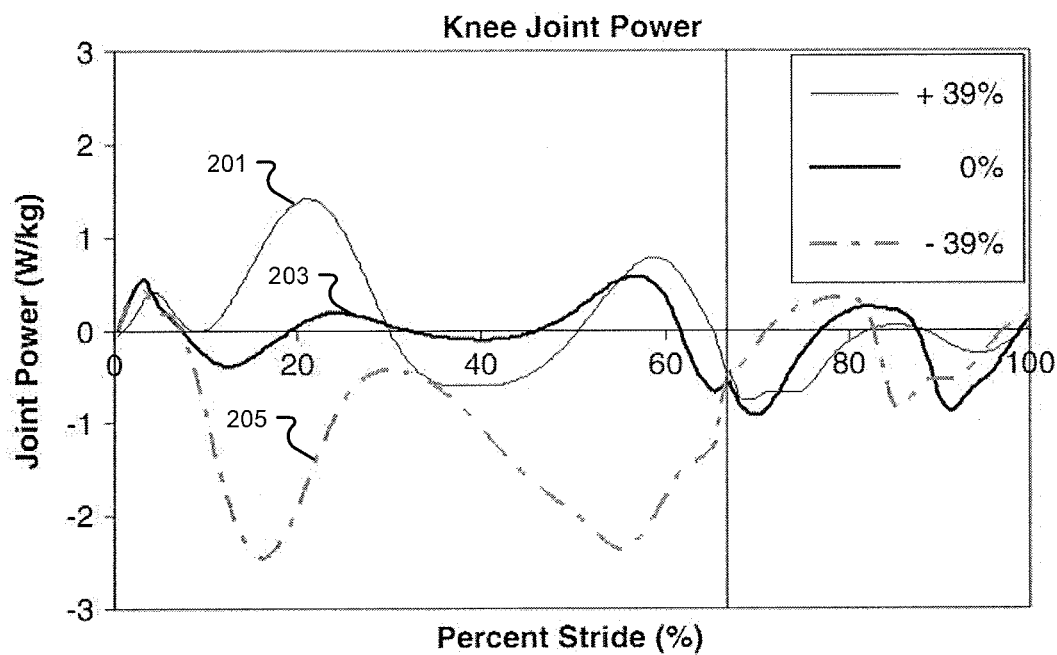
FIG. 6 shows representative plots of knee joint power when walking uphill, at flat grade and downhill.

The terrain being traversed by a host has a significant impact on the power generated by the muscles associated with the host's knee joint during a gait cycle. FIG. 6 shows power plots for one exemplary gait cycle for each of a +39% grade (plot 201), an even grade (plot 203) and a downhill grade of −39% (plot 205). As can be seen from FIG. 6, walking downhill (plot 205) increases the negative work during swing extension portion, the stance extension portion is reduced or eliminated, which increases the negative work during the stance/collision flexion portion as the stance/collision flexion portion extends to fill what was the stance extension portion. By contrast, uphill walking (plot 201) involves a reduction in the negative work at the end of the swing extension portion, while the stance flexion portion is eliminated or at least substantially reduced, which increases the positive work during the stance extension portion.

Terrain represents just one of many types of factors which may have an impact on repetitive motion associated with body segment 12, the desirability of harvesting energy from the motion of body segment 12 at any given time and how much energy should be harvested from the motion of body segment 12 at any given time. Such other types of factors may be estimated by optional factor estimator 222 to provide factor estimator output signal 222A. Factor estimator 222 may make use of a variety of information to generate factor estimator output signal 222A. By way of non-limiting example, such information may include gait phase estimate signal 206A, positive/negative power mode signal 208A, terrain estimation signal 210A, motion sensor signal(s) 202 and/or generator current feedback signal 204 and/or one or more other appropriate signals (e.g. sensor signals, user-configurable input information, calibration information and/or the like). Examples of factors which may be estimated by factor estimator 222 include, without limitation:
- gait cadence which (as discussed below) may influence the period of the repetitive motion in the time domain;
- speed of movement of the host over ground;
- host-specific gait parameters, which may influence the relative lengths of certain portions of repetitive motion. For example, certain hosts of the same size walking on the same terrain at the same speed may have swing extension portions of different lengths relative to the lengths of other gait portions;
- host size, which may influence the amplitudes of torques;
- load carried which may influence the amplitude of torques;
- location of carried load which may have different impact on different portions of the gait cycle. For example, loads carried on the back might impact the stance portions relatively more heavily while loads carried on the legs might impact swing portions relatively more heavily;
- locomotion type (e.g. walking, running, jogging, skipping, moving backwards, jumping and/or the like); and/or
- the like Some or all of the factors which may be estimated by factor estimator 222 may additionally or alternatively be specified as part of configuration input data 216 discussed further below.

Control logic 200 of the illustrated embodiment comprises a base torque profile selector 212 which serves the purpose of selecting a base torque profile 212A from a library 214 of base torque profiles. Base torque profile library 214 may be stored in memory (not expressly shown) which may be a part of, or otherwise accessible to, control logic 200. Base torque profile library 214 may comprise a library of base torque profiles for many types of repetitive motions of many types of body segments 12. For example, base torque profile library 214 may comprise a number of base torque profiles for different types of repetitive motion (e.g. walking, running, jogging, skipping, moving backwards, jumping and/or the like) when body segment 12 comprises a knee joint and other types of base torque profiles for other types of repetitive motion and other types of body segments.

The selection of a particular base torque profile 212A by base torque profile selector 212 may be based, in part, on configuration input 216. By way of non-limiting example, configuration input 216 may comprise user-configurable input information about the use of energy harvesting system 30, experimentally determined information about the use of energy harvesting system 30, calibration information about the use of energy harvesting system 30, system constant information and/or the like. For example, a host may specify (as part of configuration input 216) that they are using energy harvesting system 30 for harvesting energy about a knee joint while walking and that the host wants to harvest energy primarily during mutualistic conditions. As another example, the host may want to use energy harvesting system 30 as a part of an exercise system in which case configuration input 216 may include information indicating that energy harvesting system is to be used to harvest energy about a knee joint while jogging and that energy should be harvested primarily during non-mutualistic conditions.

Figure 7:
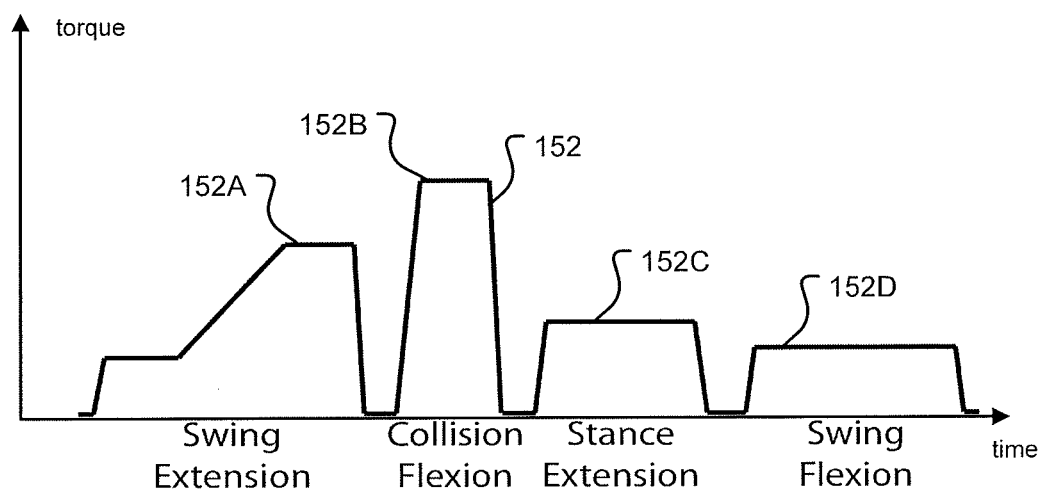
FIG. 7 shows an example base torque profile where the body segment comprises the knee joint of a host that is walking.

FIG. 7 is a plot of an example base torque profile 152 for harvesting energy from motion of the knee during walking. Base torque profile 212A selected from base torque profile library 214 by base torque profile estimator 212 may comprise a torque profile like that of plot 152. The domain of base torque profile plot 150 comprises the temporal period of one cycle (e.g. a gait cycle) of the repetitive motion of body segment 12. In the illustrated embodiment, where base torque profile 152 is associated with the motion of knee during walking, base torque profile 152 may have regions 152A-152D associated with the various portions of the gait of walking motion associated with the knee joint. The range of base torque profile 152 is indicated in the FIG. 7 illustration to be in units of torque, but may conform to the units associated with torque control signal 44A to be output by control logic 200 and to be as input to current controller 42 (FIG. 2). In this manner, base torque profile 152 may assign a base value for torque control signal 44A for each phase of the gait cycle.

It is not necessary for base torque profile 152 to have one-to-one correspondence between the base value of torque control signal 44A and a particular gait cycle phase; in some embodiments, base torque profile 152 may be defined only with reference to the beginning and/or end of a particular portion of the gait cycle. For example, base torque profile 152 may be defined relative to the transitions between swing flexion, swing extension, stance/collision flexion and stance extension without direct correspondence to the specific phases between such transitions. Base torque profiles (like base torque profile 152 of FIG. 7) may be provided in base torque profile library 214 as computable function(s), lookup table(s), raw data, a combination of these, or the like.

In the illustrated embodiment, control logic 200 comprises a torque profile adjuster 220 which adjusts the base torque profile (in an initial iteration) and/or a current torque profile (in subsequent iterations) in response to a variety of input information to provide (as output) torque control signal 44A. Torque control signal 44A may be provided to current controller 42 as discussed above. Torque profile adjuster 220 may receive input information which may include, without limitation: base torque profile 212A, gait phase estimator output 206A, positive/negative work estimator output 208A, terrain estimator output 210A, factor estimator output 222A, configuration input 216, motion sensor signal(s) 202 and/or generator current signal 204. While not explicitly shown in the schematic illustration of FIG. 5, torque profile adjustor 220 may maintain a current torque profile which includes the most recent updates to the torque profile to be tracked. The current torque profile may be saved in accessible memory or the like and may provide the basis for torque control signal 44A output from torque profile adjuster 220.

Non-limiting examples, of types of adjustments that may be made to torque profiles by torque profile adjustor 220 include, without limitation:

scaling and/or offsetting the entire torque profile in the torque domain (e.g. to compensate for host size);

scaling and/or offsetting of the entire torque profile in the time domain or in a "percentage of gait cycle" domain (e.g. to compensate for gait cadence);

scaling and/or offsetting of portions of the torque profile (e.g. one or more portions of the torque profile, one or more sub-parts of a portion in a torque profile and/or one or more transition periods between portions in a torque profile) in the torque domain (e.g. to extract more energy during the mutualistic negative power mechanical mode associated with a portion 76A of swing extension 72B (see FIG. 3) or to ensure host safety);

scaling and/or offsetting of portions of the torque profile (e.g. one or more portions of the torque profile, one or more sub-parts of a portion in a torque profile and/or one or more transition periods between portions in a torque profile) in the time domain or in a "percentage of gait cycle" domain (e.g. to compensate for different host gait profiles or to ensure host safety);

scaling and/or offsetting of the rate(s) of transitions (e.g. torque profile slopes) between different torque levels in a torque profile;

offsetting the location(s) in the time domain or in a "percentage of gait cycle" domain of changes in a torque profile;

scaling of the entire torque profile to a constant level; and/or the like.

Control logic 200 may also optionally be used to estimate voltage control signal 49 discussed above. In the illustrated embodiment, control logic 200 comprises an optional load profile controller 226 which estimates voltage control signal 49. Load profile controller 226 may use information from load voltage feedback signal 224 (e.g. from load sensor(s) 143 and/or directly from load signal 45 (FIG. 2)) to generate voltage control signal 49. In some embodiments, load profile controller 226 may also make use of configuration input 216 and/or other inputs (e.g. generator current feedback signal 204 or inputs from other sensor(s) (not shown)) to generate voltage control signal 49. By way of non-limiting example, such information from configuration input 216 may include parameters of load 14 (e.g. battery type, preferred battery charging profile and/or the like) and/or parameters of generator 16 (e.g. current output range, voltage output range and/or the like). As discussed above, voltage control signal 49 may optionally be provided to current controller 42, 42B for use in controlling the current drawn from generator 16 and the corresponding generator torque experienced by body segment 12. Load profile controller 226 may generate voltage control signal 49 which, when provided to current controller 42, causes current controller 42 to control the current drawn from generator 16 to produce desirable conditions in load circuit 48 for charging load 14.

Figure 8:
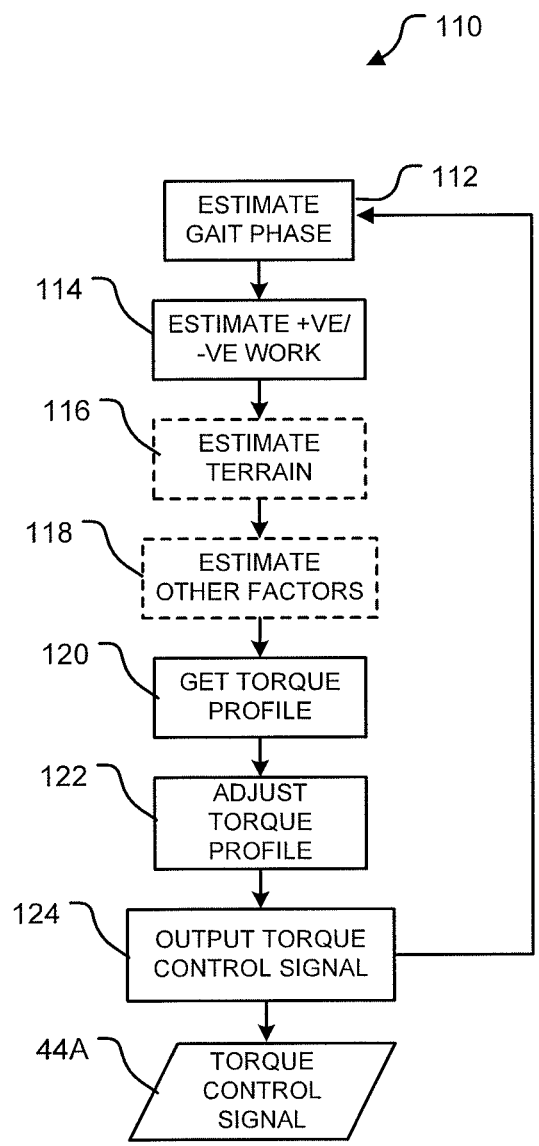
FIG. 8 is a flow chart diagram of a method for determining a torque control signal according to a particular embodiment.

FIG. 8 is a flow chart diagram of a method 110 for determining torque control signal 44A according to a particular embodiment. Method 110 may be performed by control logic 44 (FIG. 2), 200 (FIG. 5). Torque control signal 44A may be used by current controller 42 (FIG. 2) to control the current drawn from generator 16 and thereby control the torque experienced by body segment 12.

Method 110 begins in block 112 which involves using motion sensor signal(s) 202 to determine the current phase of repetitive motion of body segment 12. By way of example, when body segment 12 comprises a knee joint (see the exemplary gait cycle 70 of FIG. 3), block 112 may involve using motion sensor signal(s) 202 to determine the phase of the knee joint (e.g. the x-axis location in the FIG. 3 exemplary gait cycle 70) and whether the knee joint is in swing flexion, swing extension, stance flexion or stance extension. As discussed above, suitable exemplary techniques for gait phase estimation are described in WO2007/016781 and in Li et al. Walking Speed Estimation Using a Shank-mounted Inertial Measurement Unit, Journal of Biomechanics (2010). As discussed above, in some embodiments it is not necessary to precisely estimate the gait phase—i.e. it is not necessary to precisely estimate the x-axis location in the FIG. 3 exemplary gait cycle 70. In some embodiments, block 112 may additionally or alternatively involve estimating whether the current gate phase is within one of the particular portions of a gait cycle 70 which span a range of gait phases—e.g. whether the knee joint is in swing flexion, swing extension, stance/collision flexion or stance extension. In one particular embodiment, block 112 involves determining the transitions between gait phase portions.

After estimating the phase of the repetitive motion in block 112, method 110 proceeds to block 114 which involves estimating whether body segment 12 is in a positive or negative mechanical power mode (i.e. if energy harvesting conditions are mutualistic (negative mechanical power mode) or non-mutualistic (positive mechanical power mode). In some embodiments, the block 114 determination may involve using motion sensor signal(s) 202 and/or the estimated gait phase output of block 112. In other embodiments, other suitable inputs may be used to make the block 114 determination. Suitable exemplary techniques for estimating whether motion of body segment 12 is in a positive or negative mechanical power mode are described in WO2007/016781.

Method 110 then proceeds to optional block 116 which involves estimating the terrain being traversed by the host (e.g. in the case where body segment 12 includes a portion of the host's body associated with locomotion (e.g. the host's knee or ankle joint)). Estimating the terrain in block 116 may make use of motion sensor signal(s) 202 and/or the output of blocks 112, 114. In other embodiments, other suitable inputs may be used to make the block 116 terrain estimate. As discussed above, the terrain represents just one type of factor that may be considered during the determination of torque control signal 44A. In some embodiments, method 110 comprises an optional block 118 which involves estimating one or more other factors which may be incorporated into the determination of torque control signal 44A. Estimating such other factors in block 118 may make use of motion sensor signal(s) 202 and/or the output of blocks 112, 114, 116. In other embodiments, other suitable inputs may be used to make the block 118 factor estimate. Examples of other factors which may be incorporated into the determination of torque control signal 44A and which may be estimated in block 118 are described above.

Method 110 then proceeds to block 120 which involves getting the current torque profile. On an initial iteration (e.g. first loop) of method 110, block 120 may involve selecting a base torque profile 212A from a base torque profile library 214—see discussion above. While not explicitly shown in FIG. 8, block 120 may involve the use of configuration input information 216 to make this initial base profile selection. As will be discussed in more detail below, the initial base torque profile 212A may be adjusted during each iteration of method 110. Consequently, on the second and subsequent iterations of method 110, block 120 may involve obtaining the torque profile as adjusted during the previous iteration of method 110. This is not necessary, however, and each iteration of method 110 may involve adjustment of a base torque profile 212A. In some embodiments, block 120 may involve a decision to select a new base torque profile if it is determined that a host has changed the cyclic movement of body segment 12 (e.g. a host has started running after walking for a period).

Method 110 then proceeds to block 122 which involves adjusting the block 120 torque profile. Non-limiting examples of types of torque profile adjustments that can be made are described above. Block 122 torque profile adjustments may be based in part on the block 120 current torque profile. Block 122 torque profile adjustments may also be based on any of the other inputs to control logic 200 and/or on any of the information generated by control logic 200. Torque profile adjustments in block 122 may involve effecting a suitable compromise between the competing objectives of harvesting energy from body segment 12 and permitting user configurability. By way of non-limiting example, such user configurability, which may be provided by way of configuration input 216, may include a desire for host comfort, a desire to increase or decrease the metabolic cost of energy harvesting, a desire to ensure stability, safety, or smoothness of locomotion, a desire for energy harvesting to reflect levels of muscle fatigue and/or the like.

These competing objectives may be weighted differently in different scenarios and/or applications. Maximizing energy generation may involve upward scaling of torques. Reducing metabolic cost may involve upward scaling of torques in mutualistic (negative mechanical power) conditions and downward scaling of torques in non-mutualistic (positive mechanical power) conditions. Host locomotive stability and/or safety (e.g. in walking) may require adapting torques at particular gait phases and/or portions to avoid undue interference with gait (e.g. tripping the user). In some embodiments, the block 122 torque profile adjustment involves harvesting as much energy as possible during mutualistic (negative mechanical power) conditions without unduly interfering with the gait of the host. In some applications, the objective may be different. For example, in a fitness training application, where the host may want to build muscle strength, endurance or bulk, it may be desirable to increase torques (and harvest more energy) during non-mutualistic (positive mechanical power) conditions.

After adjustment of the torque profile in block 122, method 110 proceeds to block 124 where the adjusted torque profile is output as torque control signal 44A before method 110 loops back to block 112 for another iteration. In some embodiments, the method 110 iterations may occur relatively quickly (in comparison to the time scale associated with the movement of body segment 12) to provide real time torque adjustment. For example, in some embodiments, method 110 may iterate 100 or more times during a typical gait cycle. Real time torque adjustment is not necessary, however. In some embodiments, the torque profile may be adjusted over longer time periods—e.g. as the host becomes accustomed to energy harvesting. In such embodiments, method 110 may be substantially similar to that described above for iterations where it is desired to adjust the current torque profile, but in iterations where the torque profile will not be adjusted, torque signal 44A can be determined by estimating gait phase (block 112) and locating the gate phase on the current (block 120) torque profile.

Figure 9:
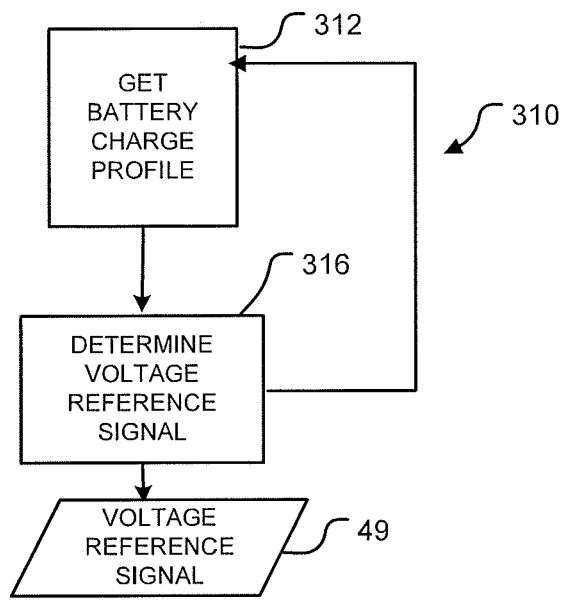
FIG. 9 is a flow chart diagram of a method for determining voltage control signal according to a particular embodiment.

FIG. 9 is a flow chart diagram of an optional method 310 for determining voltage control signal 49 according to a particular embodiment. Method 310 may be performed by control logic 44 (FIG. 2), 200 (FIG. 5). For example, method 310 may be performed by load profile control block 226 described above. Voltage control signal 49 may be used by current controller 42 (FIG. 2) to control the current drawn from generator 16 and thereby control the torque experienced by body segment 12. In some embodiments, current controller 42 uses voltage control signal 49 to control the current drawn from generator 16 and/or the torque experienced by body segment 12 in circumstances where load 14 might be damaged by permitting generator currents associated with torque control signal 44A or where it might otherwise be desirable to control the generator current in a manner dictated by load 14 rather than by torque control signal 44A. For example, in some circumstances a battery (which may be a part of load 14) can be damaged when it is charged too rapidly. In such circumstances, it may be desirable for current controller 42 to control the current drawn from generator 16 based on voltage control signal 49.

Method 310 commences in block 312 which involves getting a battery charge profile and possibly other load specific parameters. The block 312 battery charge profile may depend, for example, on battery type, battery capacity and/or battery chemistry. Determining the battery charge profile in block 312 may be based on configuration input 216, which may (but need not necessarily) be user configurable as discussed above. In some embodiments, block 312 may involve selecting a battery charge profile from a charge profile library or the like (not shown) which may be stored in accessible memory. Such a selection from a charge profile library may be based on information from configuration input 216.

Figure 10:
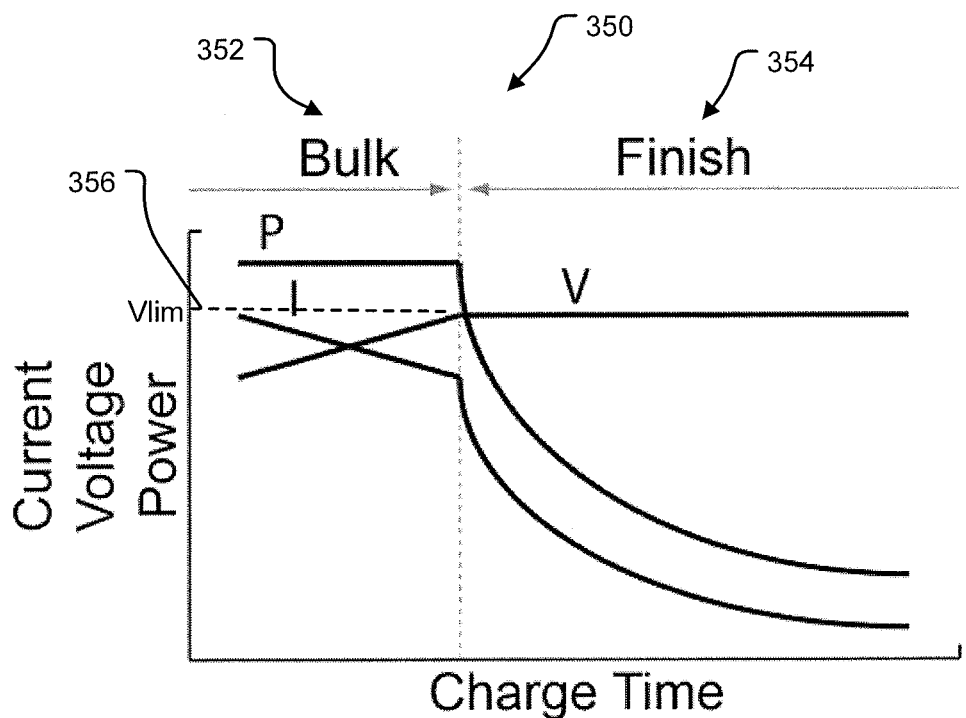
FIG. 10 is an example battery charge profile for a lithium-ion battery.

An example battery charge profile 350 for a lithium-ion battery is shown in FIG. 10. Battery charge profile 350 comprises a bulk charging portion 352 and a finish charging portion 354. The transition between bulk portion and finish portion may occur at a voltage limit level $v_{lim}$ 356. During bulk charging portion 352, the battery of load 14 may be able to accept any suitable current that may be output by generator 16 without a voltage level that exceeds voltage limit level $v_{lim}$ 356. However, during the finish charging portion of profile 350, it may be desirable to charge the battery of load 14 with lesser amounts of current from generator 16, so as to keep the voltage level at load 14 limited to voltage limit level $v_{lim}$ 356. When the voltage level at load 14 is limited to voltage limit level $v_{lim}$ 356 during finish charging potion 354, the current drawn from generator 16 into load 14 will depend on the state of charge of load 14 which itself is related to the impedance of load 14. As the battery associated with load 14 becomes charged in finish charging portion 356, the corresponding current drawn from generator 16 and provided to load 14 may decrease as the battery becomes fully charged as shown in FIG. 10.

After obtaining a battery charge profile in block 312, method 310 proceeds to block 316 which may involve determining voltage control signal 49. Voltage control signal 49 may depend on the voltage limit level $v_{lim}$ 356. In some embodiments, voltage control signal 49 may comprise voltage limit level $v_{lim}$ 356. In some embodiments (as explained in more detail below), current controller 42 may be configured to limit the generator current drawn from generator 16 into load 14 when the voltage at load 14 reaches voltage control signal 49 (e.g. voltage limit level $v_{lim}$ 356) to avoid damaging, or to otherwise optimally charge, the battery associated with load 14.

As discussed above, torque control signal 44A may be determined/adjusted in block 122 (FIG. 8) on the basis of the objectives of maximizing energy harvesting while permitting user configurability. Voltage control signal 49 may be determined in block 316 (FIG. 9) on the basis of maximizing the state of charge and/or preserving the longevity of the battery associated with load 14. Referring back to FIG. 2B, torque control signal 44A may be compared to generator current feedback signal 204 to obtain generator current difference signal 31A (reflecting how well the generator current tracks the desired generator current associated with torque control signal 44A). Similarly, voltage control signal 49 may be compared to load voltage feedback signal 224 to obtain voltage difference signal 47A. In some embodiments, voltage difference signal 47A reflects whether or not the load voltage has reached the level of voltage control signal 49 (e.g. load 14 has reached finished charging portion 354 at voltage limit level $v_{lim}$ 356). In other embodiments, voltage control signal 49 may have a particular desired voltage level and voltage difference signal 47A reflects how well the load voltage tracks the desired voltage level of voltage control signal 49.

As shown in FIG. 2B, current difference signal 31A and voltage difference signal 47A are both provided as inputs to logic circuitry 33B. Logic circuitry 33B uses these inputs to generate DC/DC control signal 39 that is used to control DC/DC converter 35. In one particular embodiment, logic circuitry 33B is configured to use current difference signal 31A to output a DC/DC control signal 39 that causes the torque developed by generator 16 to track torque control signal 44A (or generator feedback current signal 204 to track torque control signal 44A), except where tracking torque control signal 44A would cause the voltage at load 14 (e.g. as measured by voltage feedback signal 224) to be greater than voltage reference signal 49 (e.g. except where voltage difference signal 47A is less than zero). In such circumstances (which may correspond to the battery of load 14 being in its finish charge region 354), logic circuitry 33B may be configured to output a DC/DC control signal 39 that limits the voltage at load 14 to voltage limit level $v_{lim}$ 356.

In other embodiments, logic circuitry 33B may be configured to output DC/DC control signal 39 on some other logical basis involving current difference signal 31A and/or voltage difference signal 47A. For example, logic circuitry 33B may be configured to output DC/DC control signal 39 on the basis of whichever one of current difference signal 31A and voltage difference signal 47A is lower. As another example, logic circuitry 33B may be configured to output DC/DC control signal 39 on the basis of current difference signal 31A to the exclusion of voltage difference signal 47A or vice versa. In still another example embodiment, logic circuitry 33B may be configured to output DC/DC control signal 39 on the basis of a combination (e.g. a linear combination) of current difference signals 31A and voltage difference signal 47A.

Embodiments of the present invention include various operations, which are described herein. These operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Computer processing components used in implementation of various embodiments of the invention include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In particular embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

In system 30 (FIG. 2) and current controllers 42, 42A (FIG. 2A) and 42B (FIG. 2B) described above, a torque control reference signal 44A is determined by control logic 44 and then current controllers 42, 42A, 42B use generator current feedback signal 204 to track torque control signal 44A—i.e. current controllers 42, 42A, 42B attempt to minimize the difference between torque control signal 44A and generator current feedback signal 294. This difference is represented as difference signal 31A in current controllers 42A, 42B. In other embodiments, generator current feedback signal 204 may be provided to control logic 44 and control logic 44 may be used to generate a torque control signal 44A which incorporates the information associated with generator current feedback signal 204. Load voltage feedback signal 224 may be similarly provided to control logic 44 and control logic 44 may be used to generate a voltage control signal 49 which incorporates the information associated with load voltage feedback signal 224. In some embodiments, generator current feedback signal 204 and/or load voltage feedback signal 224 may be provided to logic circuits 33 (FIG. 2A) or 33B (FIG. 2B) and may be used as additional inputs to logic circuits 33, 33B for controlling DC/DC converter 35.

Torque control signal 44A described above represents a desired torque which effects a compromise between the objectives of maximizing energy harvesting while permitting user configurability and voltage control signal 49 described above represents a desired load voltage which attempts to maximize the state of charge while preserving the longevity of the battery associated with load 14. In the above described embodiments, voltage control signal 49 is determined separately from torque control signal 44A and current controller 42 (e.g. logic circuitry 33B of FIG. 2B) ultimately controls the current drawn from generator 16 based on some combination of voltage control signal 49 and torque control signal 44A. This is not necessary. In some other embodiments, control logic 44 may determine a single control signal that incorporates all of these objectives. In one example embodiment, voltage control signal 49 (which may be determined in accordance with method 310 (FIG. 9) may be provided as an additional input to torque profile adjustor 220 (FIG. 5) and to torque profile adjustment block 122 of method 110 (FIG. 8). The block 122 torque profile adjustment can then take into account voltage control signal 49 and the corresponding objectives of maximizing the state of charge while preserving the longevity of the battery associated with load 14. In this manner, torque control signal 44A may be the only signal that controls current controller 42.

Some embodiments may incorporate intermediate energy storage (e.g. intermediate electrical energy storage devices such as capacitors and/or batteries and/or intermediate mechanical energy storage devices such as a clutch and a flywheel). Such intermediate energy storage devices may permit decoupling of energy harvesting from load charging—e.g. so that energy harvesting could be optimized without concern as to the state of charge of load 14. Excess harvested energy could be temporarily stored in such intermediate energy storage devices until it could be provided to load 14 or until the battery associated with load 14 could be changed. As an example, energy harvested when the battery associated with load 14 is in its finish charge region 354 may be stored in such intermediate energy storage while energy is continually harvested optimally even though the battery associated with load 14 may not be able to accept charge at a rapid rate.

Some embodiments, may comprise generators with so-called "adaptive field strength control"—e.g. where controllable electromagnetic windings are used in the place of permanent magnets in the generator or where coils within the generator are dynamically switchable (e.g. on or off) to change the generator characteristics. In particular embodiments, generators using such adaptive field strength control may be controlled to vary the generator operating characteristics. For example, generators using such adaptive field strength control may be used to cause the generator 16 to controllably track torque/current control signal 44A and/or to controllably track torque/current control signal 44A subject to maintaining the voltage at load 14 less than voltage reference signal 49.

Accordingly, this invention should be interpreted in accordance with the following claims.

What is claimed is:

1. An apparatus for harvesting energy from motion of a human or animal body segment, the apparatus comprising:
   a generator operatively coupled to the body segment such that particular movement of the body segment causes the generator to output a generator current and to oppose the particular movement of the body segment with a generator torque;
   an electrical load coupled to receive the generator current;
   a control system operatively connected between the generator and the electrical load, the control system configured to control the generator torque during the particular movement of the body segment to track a torque control signal, the torque control signal representative of a desired generator torque;
   wherein the control system is connected to receive one or more feedback inputs and is configured to control the generator torque based at least in part on the one or more feedback inputs; and
   wherein the control system is configured to use the one or more feedback inputs to estimate one or more body segment feedback inputs which are representative of one or more corresponding aspects of movement of the body segment.

2. An apparatus according to claim 1 wherein the one or more feedback inputs comprise a signal indicative of a frequency of the generator output and wherein the one or more body segment feedback inputs comprise an estimate of the angular velocity of the body segment based on the frequency of the generator output.

3. An apparatus according to claim 1 comprising a motion sensor configured to sense one or more characteristics of movement of the body segment, wherein the one or more feedback inputs comprise an output of the motion sensor and wherein the one or more body segment feedback inputs comprise an estimate of the angular velocity of the body segment based on the output of the motion sensor.

4. An apparatus according to claim 1 wherein the particular movement of the body segment comprises repetitive motion and wherein the control system is configured to estimate one or more characteristics of the repetitive motion based at least in part on the one or more body segment feedback inputs and to control the generator torque during the repetitive motion based at least in part on the one or more characteristics of the repetitive motion.

5. An apparatus according to claim 4 wherein the one or more characteristics of the repetitive motion comprise a phase of the repetitive motion.

6. An apparatus according to claim 5 wherein the phase of the repetitive motion comprises a phase of a gait cycle.

7. An apparatus according to claim 4 wherein the one or more characteristics of the repetitive motion comprise transitions between a plurality of portions of the repetitive motion, each portion of the repetitive motion spanning a range of phases of the repetitive motion.

8. An apparatus according to claim 7 wherein the plurality of portions of the repetitive motion comprise portions of a gait cycle comprising: a swing flexion portion, a swing extension portion, a stance/collision flexion portion and a stance extension portion.

9. An apparatus according to claim 4 wherein the control system is configured to control the generator torque during the repetitive motion based at least in part on the one or more characteristics of the repetitive motion by determining the torque control signal based at least in part on the one or more characteristics of the repetitive motion.

10. An apparatus according to claim 9 wherein the one or more characteristics of the repetitive motion comprise a phase of the repetitive motion.

11. An apparatus according to claim 10 wherein the phase of the repetitive motion comprises a phase of a gait cycle.

12. An apparatus according to claim 9 wherein the one or more characteristics of the repetitive motion comprise transitions between a plurality of portions of the repetitive motion, each portion of the repetitive motion spanning a range of phases of the repetitive motion.

13. An apparatus according to claim 12 wherein the plurality of portions of the repetitive motion comprise portions of a gait cycle comprising: a swing flexion portion, a swing extension portion, a stance/collision flexion portion and a stance extension portion.

14. An apparatus according to claim 9 wherein the one or more characteristics of the repetitive motion comprise regions of the repetitive motion where the particular movement of the body segment is associated with positive mechanical power and regions of the repetitive motion where the particular movement of the body segment is associated with negative mechanical power.

15. An apparatus according to claim 14 wherein the control system is configured to determine the torque control signal based at least in part on the one or more characteristics of the repetitive motion by determining the torque control signal to be relatively low in the positive mechanical power regions and relatively high in the negative mechanical power regions.

16. An apparatus according to claim 15 wherein the control system is configured to determine the torque control signal to be substantially zero in the positive mechanical power regions.

17. An apparatus according to claim 9 wherein the one or more characteristics of the repetitive motion comprise an identification that the repetitive motion is being impacted by one or more environmental factors.

18. An apparatus according to claim 17 wherein the repetitive motion comprises a repetitive gait cycle associated with the body segment and wherein the one or more environmental factors comprise a slope of the terrain over which a host of the body segment is moving.

19. An apparatus according to claim 18 wherein the control system is configured to determine the torque control signal to be relatively high over at least a portion of the gait cycle when the terrain slope is downhill and to determine the torque control signal to be relatively low over the portion of the gait cycle when the terrain slope is uphill.

20. An apparatus according to claim 17 wherein the repetitive motion comprises a repetitive gait cycle associated with the body segment, the one or more environmental factors comprise a load being carried by a host of the body segment and the control system is configured to determine the torque control signal to be relatively low when it is determined that a load is being carried by the host and relatively high when it is determine that a load is not being carried by the host.

21. An apparatus according to claim 9 wherein the control system is configured to determine the torque control signal based at least in part on the one or more characteristics of the repetitive motion by starting with a base torque profile which defines a base desired generator torque over a cycle of the repetitive motion and adjusting the base torque profile based at least in part on the one or more characteristics of the repetitive motion to obtain an adjusted torque profile which defines an adjusted desired generator torque over a cycle of the repetitive motion.

22. An apparatus according to claim 21 wherein the control system is configured to periodically adjust the adjusted torque profile based at least in part on the one or more characteristics of the repetitive motion to obtain a new adjusted torque profile.

23. An apparatus according to claim 21 wherein the control system is configured to periodically repeat the process of starting with the base torque profile and adjusting the base torque profile based at least in part on the one or more characteristics of the repetitive motion to obtain the adjusted torque profile.

24. An apparatus according to claim 21 wherein the control system is configured to start with the base torque profile by selecting the base torque profile from a library of base torque profiles.

25. An apparatus for harvesting energy from motion of a human or animal body segment, the apparatus comprising:
   a generator operatively coupled to the body segment such that particular movement of the body segment causes the generator to output a generator current and to oppose the particular movement of the body segment with a generator torque;
   an electrical load coupled to receive the generator current;
   a control system operatively connected between the generator and the electrical load, the control system configured to control the generator torque during the particular movement of the body segment to track a torque control signal, the torque control signal representative of a desired generator torque;
   wherein the control system is connected to receive one or more feedback inputs and is configured to control the generator torque based at least in part on the one or more feedback inputs; and
   wherein the one or more feedback inputs comprises a generator current feedback input representative of the generator current.

26. An apparatus according to claim 25 wherein the control system is configured to use the generator current feedback input to estimate a generator torque feedback input representative of the generator torque.

27. An apparatus according to claim 26 wherein the control system is configured to track the torque control signal by minimizing a torque difference signal, the torque difference signal comprising a difference between the generator torque feedback input and the torque control signal.

28. An apparatus according to claim 27 wherein the control system comprises a DC/DC converter and the control system is configured to determine a DC/DC control signal provided as an input to the DC/DC converter based at least in part on the torque difference signal.

29. An apparatus according to claim 28 wherein the DC/DC converter is connected between the generator and the electrical load and the DC/DC converter is configured to draw current from the generator and to output current to the electrical load based at least in part on the DC/DC control signal.

30. An apparatus for harvesting energy from motion of a human or animal body segment, the apparatus comprising:
   a generator operatively coupled to the body segment such that particular movement of the body segment causes the generator to output a generator current and to oppose the particular movement of the body segment with a generator torque;
   an electrical load coupled to receive the generator current;
   a control system operatively connected between the generator and the electrical load, the control system configured to control the generator torque during the particular movement of the body segment by controlling the generator current to track a torque control signal, the torque control signal representative of a desired generator current;
   wherein the control system is connected to receive one or more feedback inputs and is configured to control the generator current to track the torque control signal based at least in part on the one or more feedback inputs and wherein the one or more feedback inputs comprises a generator current feedback input representative of the generator current.

31. An apparatus according to claim 30 wherein the control system is configured to control the generator current to track the torque control signal by minimizing a current difference signal, the current difference signal comprising a difference between the generator current feedback input and the torque control signal.

32. An apparatus according to claim 31 wherein the control system comprises a DC/DC converter and the control system is configured to determine a DC/DC control signal provided as an input to the DC/DC converter based at least in part on the current difference signal.

33. An apparatus according to claim 32 wherein the DC/DC converter is connected between the generator and the electrical load and the DC/DC converter is configured to draw current from the generator and to output current to the electrical load based at least in part on the DC/DC control signal.

34. An apparatus for harvesting energy from motion of a human or animal body segment, the apparatus comprising:
a generator operatively coupled to the body segment such that particular movement of the body segment causes the generator to output a generator current and to oppose the particular movement of the body segment with a generator torque;
an electrical load coupled to receive the generator current;
a control system operatively connected between the generator and the electrical load, the control system configured to control the generator torque during the particular movement of the body segment to track a torque control signal, the torque control signal representative of a desired generator torque;
wherein the control system is connected to receive one or more feedback inputs and is configured to control the generator torque based at least in part on the one or more feedback inputs;
wherein the one or more feedback inputs comprises a load feedback input correlated with an electrical state of the electrical load, the load feedback input comprising a load voltage feedback signal representative of a voltage of the load; and
wherein the control system is configured to control the generator torque based at least in part on the load voltage feedback signal by limiting the generator torque to maintain the load voltage feedback signal at a value less than or equal to a voltage control reference.

35. An apparatus according to claim 34 wherein the electrical load comprises a battery and the voltage control reference is configurable to represent a voltage limit level $v_{lim}$ which will avoid damage to the battery in a finish charging region.

36. An apparatus according to claim 27 wherein the one or more feedback inputs comprises a load voltage feedback signal representative of a voltage at the load and the control system is configure to minimize the torque difference signal subject to a generator torque limit which maintains the load voltage feedback signal at a value less than or equal to a voltage control reference.

37. An apparatus according to claim 31 wherein the one or more feedback inputs comprises a load voltage feedback signal representative of a voltage at the load and the control system is configure to minimize the current difference signal subject to a generator current limit which maintains the load voltage feedback signal at a value less than or equal to a voltage control reference.

38. A method for harvesting energy from motion of a human or animal body segment, the method comprising:
operatively coupling a generator to the body segment such that particular movement of the body segment causes the generator to output a generator current and to oppose the particular movement of the body segment with a generator torque;
connecting an electrical load to receive the generator current;
controlling the generator torque during the particular movement of the body segment using a control system connected between the generator and the electrical load;
wherein controlling the generator torque during the particular movement of the body segment comprises:
controlling the generator torque to track a torque control signal, the torque control signal representative of a desired generator torque; and
receiving one or more feedback inputs and controlling the generator torque based at least in part on the one or more feedback inputs; and
the method further comprising:
using the one or more feedback inputs to estimate one or more body segment feedback inputs which are representative of one or more corresponding aspects of movement of the body segment.

39. A method according to claim 38 wherein the one or more feedback inputs comprise a signal indicative of a frequency of the generator output and wherein the one or more body segment feedback inputs comprise an estimate of the angular velocity of the body segment based on the frequency of the generator output.

40. A method according to claim 38 wherein the particular movement of the body segment comprises repetitive motion and wherein the method comprises estimating one or more characteristics of the repetitive motion based at least in part on the one or more body segment feedback inputs and controlling the generator torque during the repetitive motion based at least in part on the one or more characteristics of the repetitive motion.

41. A method according to claim 40 wherein controlling the generator torque during the repetitive motion based at least in part on the one or more characteristics of the repetitive motion comprises determining the torque control signal based at least in part on the one or more characteristics of the repetitive motion.

42. A method for harvesting energy from motion of a human or animal body segment, the method comprising:
operatively coupling a generator to the body segment such that particular movement of the body segment causes the generator to output a generator current and to oppose the particular movement of the body segment with a generator torque;
connecting an electrical load to receive the generator current;
controlling the generator torque during the particular movement of the body segment using a control system connected between the generator and the electrical load;
wherein controlling the generator torque during the particular movement of the body segment comprises:
controlling the generator torque to track a torque control signal, the torque control signal representative of a desired generator torque; and
receiving one or more feedback inputs and controlling the generator torque based at least in part on the one or more feedback inputs; and wherein the one or more feedback inputs comprises a generator current feedback input representative of the generator current.

43. A method according to claim 42 comprising using the generator current feedback input to estimate a generator torque feedback input representative of the generator torque.

44. A method according to 43 wherein controlling the generator torque to track the torque control signal comprises minimizing a torque difference signal, the torque difference signal comprising a difference between the generator torque feedback input and the torque control signal.

45. A method for harvesting energy from motion of a human or animal body segment, the method comprising:
  operatively coupling a generator to the body segment such that particular movement of the body segment causes the generator to output a generator current and to oppose the particular movement of the body segment with a generator torque;
  connecting an electrical load to receive the generator current;
  controlling the generator torque during the particular movement of the body segment using a control system connected between the generator and the electrical load;
  wherein controlling the generator torque during the particular movement of the body segment comprises controlling the generator current to track a torque control signal, the torque control signal representative of a desired generator current; and
  the method further comprising:
  receiving one or more feedback inputs, wherein controlling the generator current to track the torque control signal is based at least in part on the one or more feedback inputs and wherein the one or more feedback inputs comprises a generator current feedback input representative of the generator current.

46. A method according to claim 45 wherein controlling the generator current to track the torque control signal comprises minimizing a current difference signal, the current difference signal comprising a difference between the generator current feedback input and the torque control signal.

47. A method for harvesting energy from motion of a human or animal body segment, the method comprising:
  operatively coupling a generator to the body segment such that particular movement of the body segment causes the generator to output a generator current and to oppose the particular movement of the body segment with a generator torque;
  connecting an electrical load to receive the generator current;
  controlling the generator torque during the particular movement of the body segment using a control system connected between the generator and the electrical load;
  wherein controlling the generator torque during the particular movement of the body segment comprises:
    controlling the generator torque to track a torque control signal, the torque control signal representative of a desired generator torque; and
    receiving one or more feedback inputs and controlling the generator torque based at least in part on the one or more feedback inputs; and
  wherein the one or more feedback inputs comprises a load voltage feedback signal representative of a voltage at the load;
  the method further comprising:
  controlling the generator torque based at least in part on the load voltage feedback signal by limiting the generator torque to maintain the load voltage feedback signal at a value less than or equal to a voltage control reference.

48. A method according to claim 44 wherein the one or more feedback inputs comprises a load voltage feedback signal representative of a voltage at the load and the method comprising minimizing the torque difference signal subject to a generator torque limit which maintains the load voltage feedback signal at a value less than or equal to a voltage control reference.

49. A method according to claim 46 wherein the one or more feedback inputs comprises a load voltage feedback signal representative of a voltage at the load and the method comprises minimizing the current difference signal subject to a generator current limit which maintains the load voltage feedback signal at a value less than or equal to a voltage control reference.

* * * * *